AUTOMATIC PRODUCTION-CONVEYING AND WAREHOUSING SYSTEMS

Filed Dec. 26, 1957 10 Sheets-Sheet 1

INVENTORS
Lester L. Bosch and
Alvin J. Fanthorp
BY Gerald B. Tjoflat
Their Attorney Jan. 1, 1963 L. L. BOSCH ET AL 3,071,262

AUTOMATIC PRODUCTION-CONVEYING AND WAREHOUSING SYSTEMS

Filed Dec. 26, 1957 10 Sheets-Sheet 2

INVENTORS
Lester J. Bosch and
Alvin J. Fanthorp
BY Gerald B. Tjoflat
Their attorney INVENTORS
Lester L. Bosch and Alvin J. Fanthorp
BY Gerald B. Tjoflat
Their attorneys Lester L. Bosch and Alvin J. Fanthorp INVENTORS
BY Gerald B. Tjoflat
Their Attorney

| CHAN. 5 | CHAN. 4 | CHAN. 3 | CHAN. 2 | CHAN. 1 |
|---|---|---|---|---|
| O | O | O | O | X |
| O | O | O | X | O |
| O | O | O | X | X |
| O | O | X | O | O |
| O | O | X | O | X |
| O | O | X | X | O |
| O | O | X | X | X |
| O | X | O | O | O |
| O | X | O | O | X |
| O | X | O | X | X |
| O | X | O | X | X |
| O | X | X | O | O |
| O | X | X | O | X |
| O | X | X | X | O |
| O | X | X | X | X |
| X | O | O | O | O |
| X | O | O | O | X |
| X | O | O | X | X |
| X | O | O | X | X |
| X | O | X | O | O |
| X | O | X | O | X |
| X | O | X | X | O |
| X | O | X | X | X |
| X | X | O | O | O |
| X | X | O | O | X |
| X | X | O | X | O |
| X | X | O | X | X |
| X | X | X | O | O |
| X | X | X | O | X |
| X | X | X | X | O |
| X | X | X | X | X |
FIGURE 5
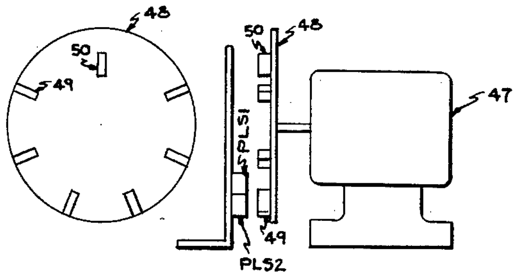
FIGURE 6
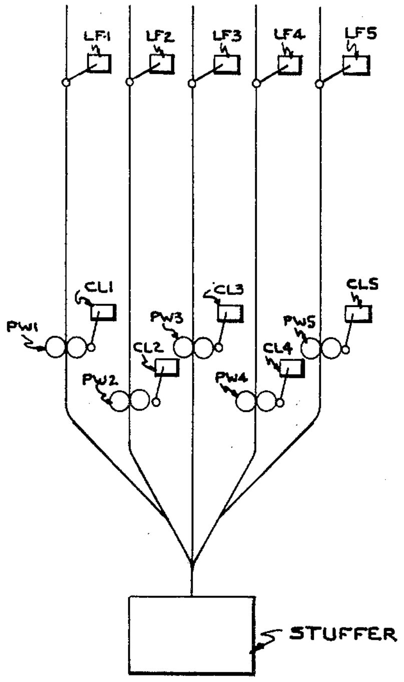
FIGURE 7
INVENTORS
Lester L. Bosch and
Alvin J. Fanthorp
BY Gerald B. Tjoflat
Their attorney INVENTORS
Lester L. Bosch and
Alvin J. Fandorp
BY
Gerald B. Tjoflat
Their attorney

AUTOMATIC PRODUCTION-CONVEYING AND WAREHOUSING SYSTEMS

Filed Dec. 26, 1957 10 Sheets-Sheet 7

INVENTORS
Lester J. Bosch and
Alvin J. Fauthorp
BY Gerald B. Tjoflat
Their Attorney INVENTORS
Lester L. Bosch and
Alvin J. Fanthorp
BY Gerald B. Tjoflat
Their Attorney INVENTORS
Lester L. Bosch and
Alvin J. Fanthorp
BY Gerald B. Tjoflot
Their Attorney INVENTORS
Lester L. Bosch and
Alvin J. Fanthorp
BY Gerald B. Tjoflat
Their Attorney 3,071,262

AUTOMATIC PRODUCTION-CONVEYING AND WAREHOUSING SYSTEMS

Lester L. Bosch, Cincinnati, Ohio, and Alvin J. Fanthorp, Covington, Ky.; said Fanthorp assignor to said Bosch and Robert W. La Tour, doing business as Bosch & La Tour, a partnership, Cincinnati, Ohio Filed Dec. 26, 1957, Ser. No. 705,431
24 Claims. (Cl. 214—16.4)

This invention relates to automatic material handling and particularly to control equipment which will permit handling articles of various kinds on individual conveyor lines that feed to a single transporting line and then into a multiplicity of pre-selected storage locations all according to identified products. The flow of articles, whether as individual or as carton or packaged units, is recorded on a coding tape. The materials then pass to transfer stations where the various lines merge and from which they are again transported, coded and finally delivered to a specially constructed warehousing device, for example, a jib crane conveyor, or simply a jib crane. Following initial synchronization of product with tape coding the product flow and control involved is all automatic as will be made apparent from the following:

The control system starts as an associated part of production in the various product areas or departments. As for example, in a pre-mix food plant where cake, biscuit, pie crust and other ready mixes for food are packaged. Memory circuits between the various departments and the finished goods warehouse causes the storing of information giving the sequence in which the respective product cartons or shippers containing packages originate. From the production areas the cartons are conveyed to merging points and then single file, by means of power and gravity conveyors, to the "Jib Crane" located in the finished goods warehouse which may be some several hundred feet distant. Here the cartons are identified and dispatched automatically to pre-selected magazine or "on storage" conveyor lines.

An object of the invention is to provide a fully automatic system that will record on a coded tape the kind of product being produced in a department or area and scheduled for transport to the warehousing device. The apparatus includes means following initial synchronizing of code registration with product flow, for the subsequent decoding of the tape for identification of the individual articles or products and through the application of automatic control of delivery of these products to preselected storage receptacles or magazines.

A further object of the invention is to provide a system whereby a plurality of conveyor lines, one for each of a plurality of producing areas, may be so coordinated one with the other that the product delivered by any one producing area is coded on a coding tape and the codes of the various individual tapes transferred to a master coding tape so that codes appearing on the master tape faithfully represent the sequence of carton flow from the various producing areas to a single discharge conveyor.

Another object of the invention is to provide a means in each department such as a plug board where a member of the supervisory staff can establish the product scheduled to be made on each line and which means can be used to create in combination with other equipment an identifying code for each article or product group produced on each line.

Another object of the invention is to provide a system as above stated in which a control system is provided for each production area to release individual product lines automatically and in a predetermined preferential sequence.

A closely related object of the invention is to provide an impulse generator which automatically creates a predetermined series of discretely spaced pulses for each signal of the release of a batch or product group from the production lines and which impulse generator, in cooperation with the line release control system and the production plug-in code board, establishes a particular code on the tape for each object or carton unit which is to be delivered to the warehousing device or terminal point.

A further object of the invention is to provide a code forming mechanism and a code reading mechanism in combination with each other such that the tape generated by the code forming mechanism feeds directly into the code reading mechanism and is so arranged that the forming and reading mechanisms may be actuated independently so that a tape loop between the two mechanisms of variable length may form, but which is protected against becoming too short by the introduction of a tight tape control, which control, in turn, is inter-connected to the pertinent section of the conveyor system so that when the tight tape control mechanism is actuated the reader will not be called upon to operate and thus protect against faulty operation at the system or damage to the tape.

A still further object of the invention is to provide a pre-set dispatch or plug board in which supervisory personnel can establish in advance the location to which identified products are to be dispatched by the warehousing device, and further that this pre-set dispatch board be provided with means for indicating the sequence of choices of location for the respective products so that in the event the first choice receptacle or conveyor line is filled, the product is then dispatched automatically to the second and other subsequent choices. A further object of this invention is to provide a coordination of the master tape reader, the setting of the preset dispatch board, operation of the warehousing device, with starting and stopping of the conveyor belt atop the warehousing device and with means for indicating back to the control means the true position of the warehousing device with relation to the receptacles or conveyor magazine components destined to receive the articles or cartons.

A further object of the invention is to so coordinate the warehousing device control means with limit switches in each receptacle or conveyor line and with the dispatch board setting, that if a location becomes full, the warehousing device control means will automatically direct the dispatch of products to the second, third and subsequent choice locations.

Another object of the invention is to provide a protective system in which mal-functions either through out-of-synchronization of the tape, failure of supervisory personnel to properly set the dispatch board, or failure of mechanical equipment in the conveying and delivery of the products or control equipment, will automatically stop the warehousing device and sound a trouble alarm.

Another object of the invention is to provide a system in which articles may be conveyed singly or piggy-back for the purpose of better utilizing storage space in the conveyor and the provision of means for automatically stopping the jib crane belt and sounding an alarm if and when a piggy-back unit should dissolve into two single cartons and, hence, cause mal-function of the control means.

The above and other objects will be apparent to those of ordinary skill in the art to which the invention pertains, from the following description and the drawings.

In the drawings:

FIGURE 5 is a view illustrating the binomial system used in setting up the codes for the department and master tapes of the control apparatus.

FIGURE 6 is a view in perspective of a pulse generator embodied in the circuit of FIGURE 4.

FIGURE 7 is a configuration of the department release lines ahead of a carton stuffing station.

Figure 9:
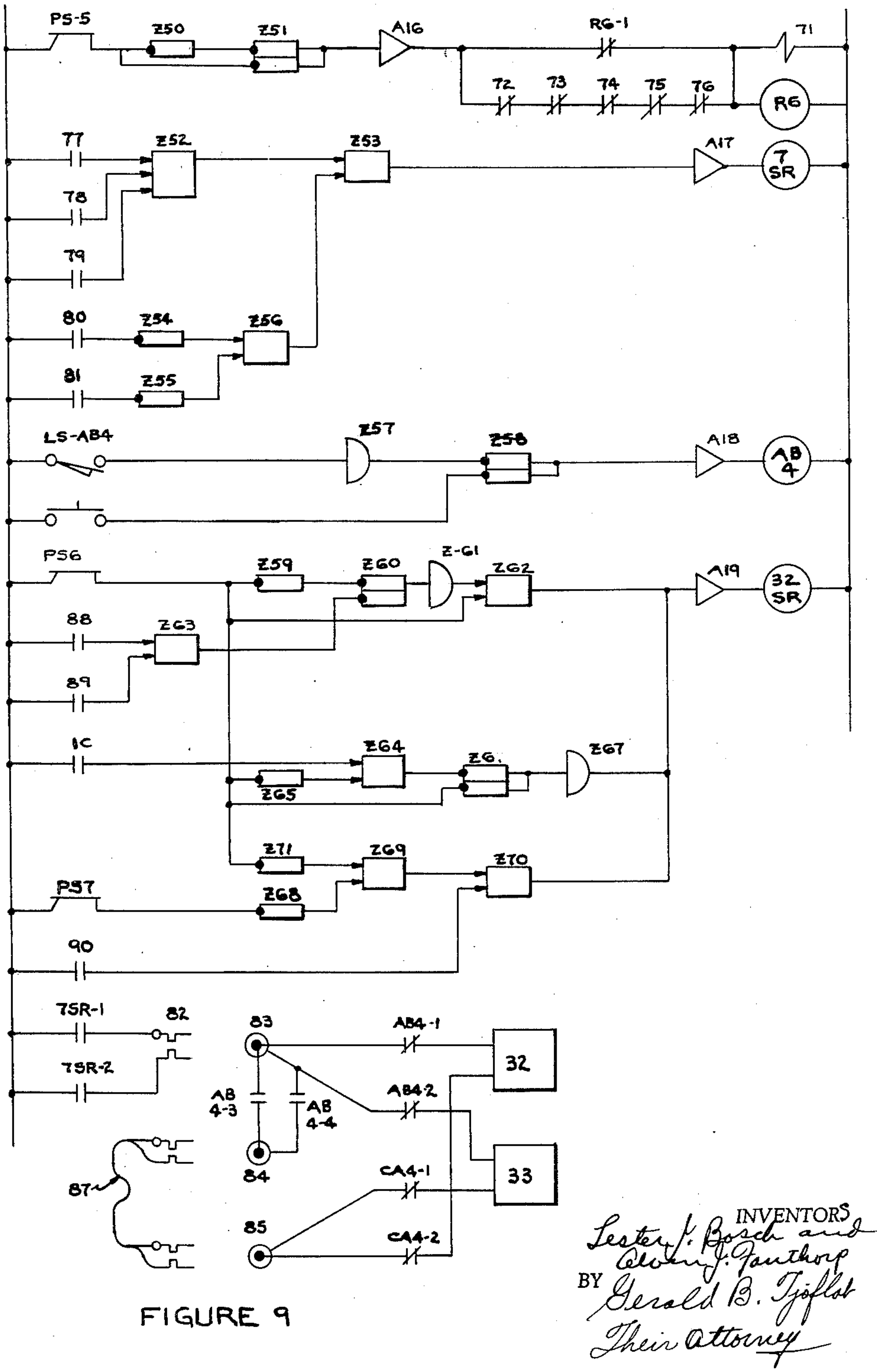

FIGURE 9 is a schematic illustration of control circuits for indexing the master tape reader, for decoding the master tape codes and translating the same into control signals by which the operation of the jib crane or warehousing device is positioned with respect to magazine storage channels, including circuits for stopping the jib crane belts in response to the occurrence of any malfunction of the apparatus.

Figure 10:
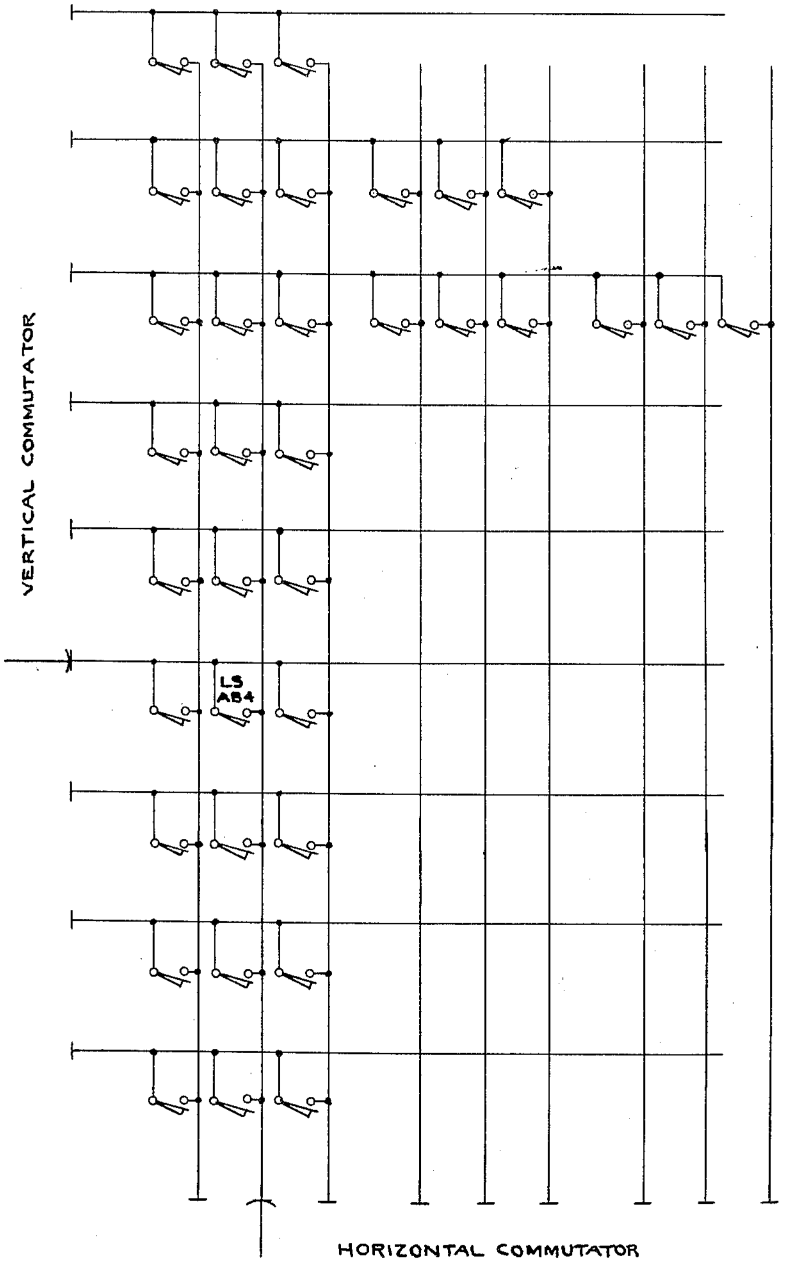

FIGURE 10 is a schematic illustration of a circuit whereby magazine limit switches are selected as to location by vertical and horizontal traverse controls for the jib crane.

Figure 11:
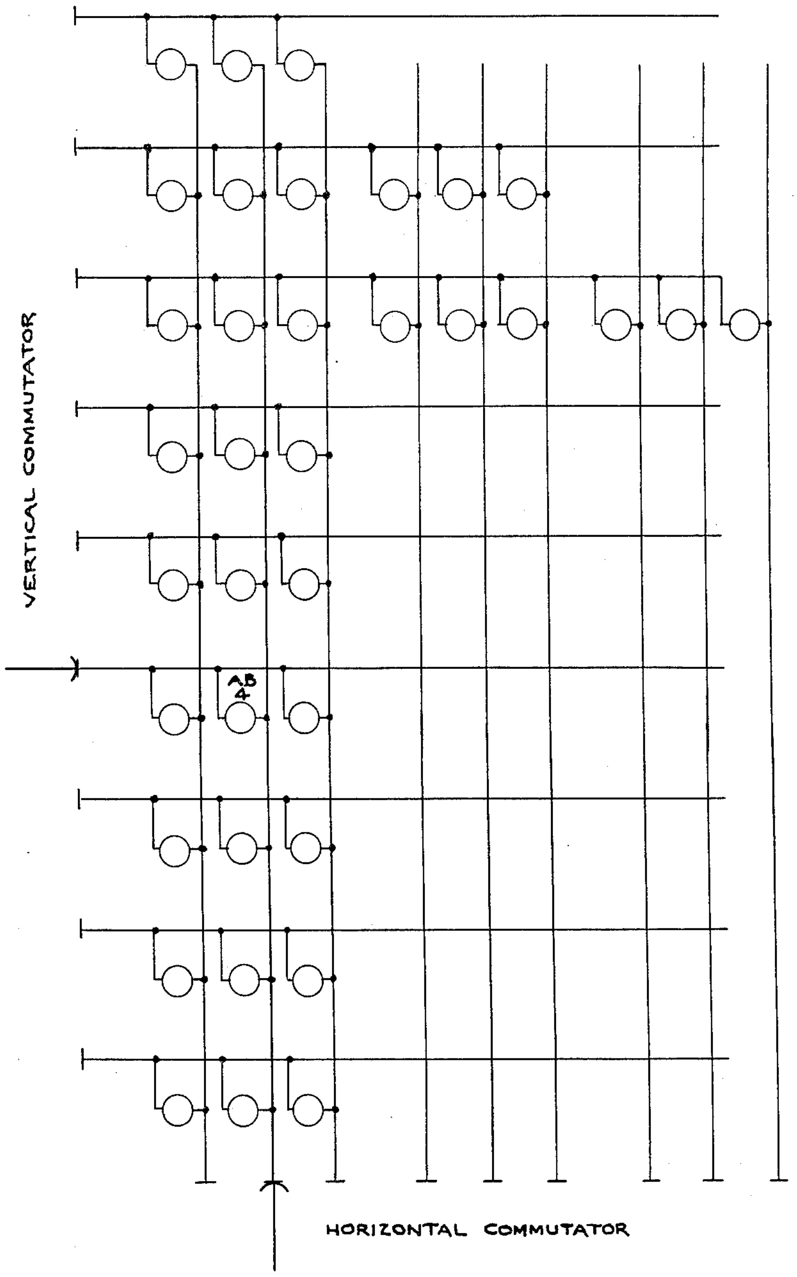

FIGURE 11 is a schematic illustration of a circuit whereby magazine relays are selected as to location by vertical and horizontal traverse controls for the jib crane.

Figure 12:
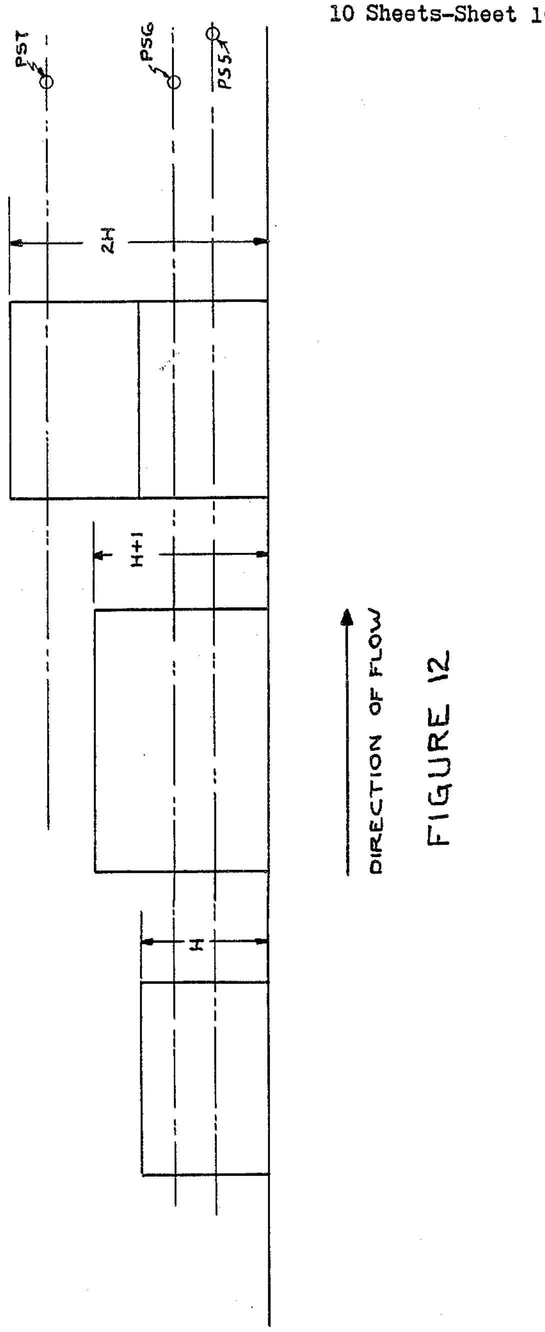

FIGURE 12 illustrates the various carton heights compared to the elevations of the photo cells comprising photo station 34.

The information about to be described has application to the handling of a variety of manufactured products. However, the principle and the scope of the invention can readily be understood by considering it as a system having particular application to a food manufacturing plant. In such a plant there may be various departments in which cake, biscuit and other mixes are made. Each department may have one or more product lines. As can be readily appreciated, the various product lines may be changed over from one type of product to another as the market or the season demands. Therefore, the number of pre-mixed food products that the system can be called upon to handle substantially exceeds the actual number of lines installed.

Carton travel from the respective product departments is by powered and gravity conveyor lines to the warehouse. The particular system shown and described infra provides for carton travel from the respective production departments over the conveyor lines mentioned through an automatically operated merging station to the warehouse. At the warehouse a special unattended jib crane or warehousing device accomplishes automatic dispatching of the cartons to magazine type storage. The crane and associated electric circuitry are designed to identify and handle automatically many different product identities, in this example, 31 different products, at a plant production rate of many thousands of shipping cartons per day.

Two types of storage are provided in the warehouse, live and floor. Live storage in this instance consists of 81 gravity flow conveyor lines arranged in three magazine groups, each three conveyors wide and nine conveyors high with the whole assembly providing many thousand feet of lineal carton unit storage.

Cartons are held in "live storage" by hand operated brakes at the end of each line. By brakes is meant the means of causing the leading cartons in a magazine line to be raised off the supporting conveyor, thus by friction and wedging action from above, restraining the flow of cartons in the line. The brakes are selectively released by manual operation for transport of the stored cartons to the shipping docks. This system is particularly desirable where a considerable portion of each day's product production can be shipped directly from live storage; with the smaller portion diverted from the conveying system and hand stored on the floor.

"Floor" storage is for the purpose of temporary handling products which are not produced each day and as a "fly wheel" in the handling of short seasonal cycles. Handling work for floor storage is minimized by returning cartons to the conveyor magazine lines for transport to the shipping docks.

Figure 1:
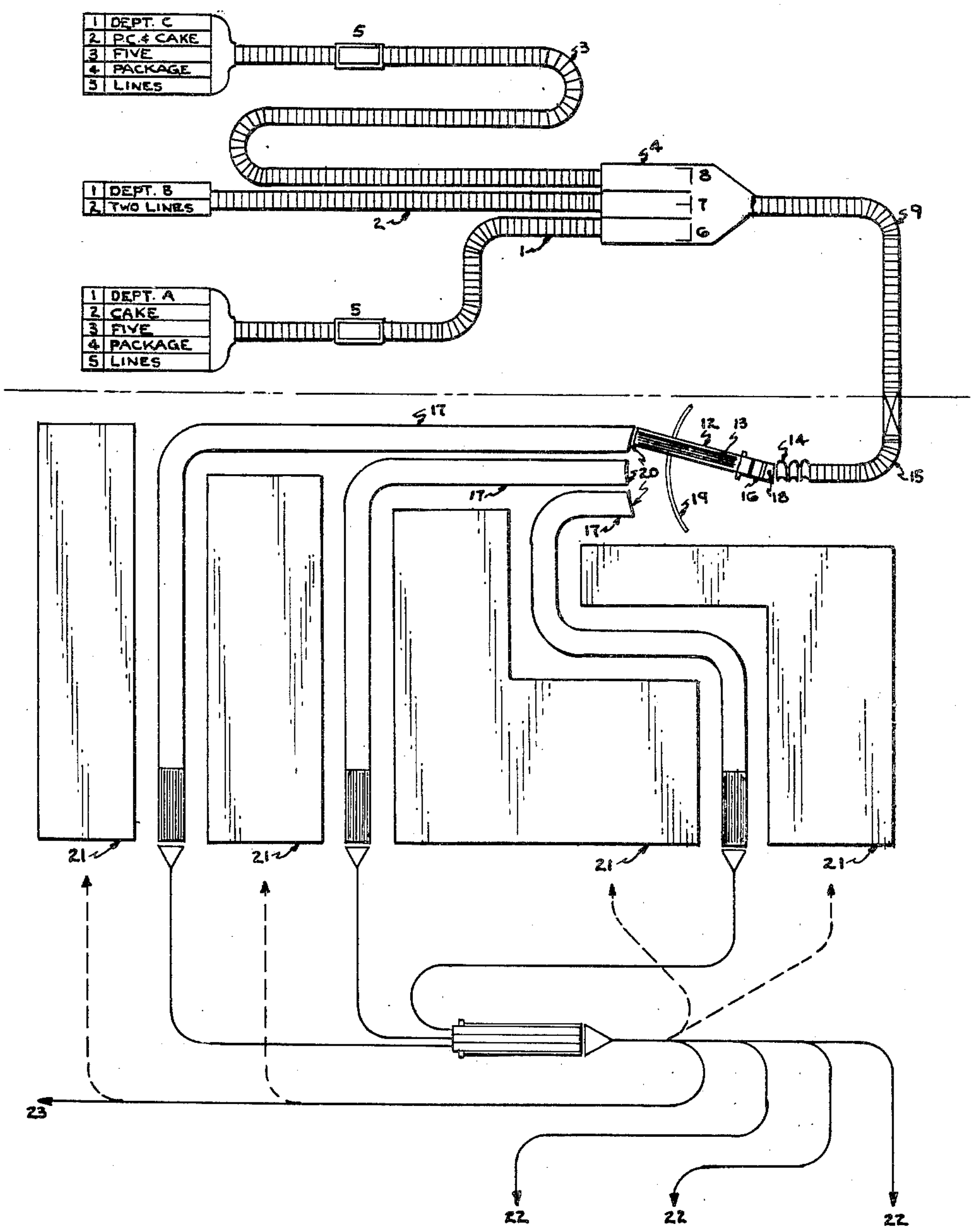
FIGURE 1 is a schematic plan view shaded in parts to show floor spaces of a conveyor system leading from a plurality of production areas to a warehousing station, and to which the invention pertains.

FIGURE 1 illustrates schematically the arrangement of various departments in which packaged goods are made, the conveyors from those departments to the warehouse storage and the configuration of conveyors within the warehouse.

As shown there are two departments designated A and C which include five package release lines and one department, designated B, which includes two package release lines. There may be more or less than the number indicated. When department B includes more than one line, the shipping cartons of each line must be different in size from the cartons of the other lines in that department. While the drawing indicates particular types of products, it is to be understood that the products in any department may change from time to time and that the drawing is merely illustrative of the system.

The products released by the various lines in Departments A, B and C are released a line at a time onto conveyors 1, 2 and 3 leading to a merging station 4. Any conveyor line 1, 2 and 3 from a department may be provided with a machine 5 for piggy-backing cartons as and when desired, provided the overall size of the piggy-back carton is within the limits of the particular system. For illustration purposes piggy-back machines 5 are located in the conveying lines 1, 3 from Departments A and C. These machines glue two cartons together to form a piggyback unit measuring in this example approximately 9" wide x 12" high x 14" long. One of the purposes of piggy-backing is to double the "live" storage capacity of the conveyors.

The merge station contains flow control arms or gates 6, 7 and 8, one for each conveyor feeding to it. The gates 6, 7 and 8 are so controlled that only one can be opened at a time provided the others are closed and latched and a time interval has elapsed. The time interval is of such duration that any carton immediately downstream of a gate, 6, 7 and 8 can reach the single line conveyor 9 before another gate is opened.

Where station 4 is not employed, a single coded tape would be sufficient to control the conveying of the goods to and storing them in the magazine. But when a station 4 is employed, the control system is modified to accommodate the functions of that station.

At a converging point, immediately downstream of the control arms is a photo detecting station 10 that is activated each time a carton passes it. Station 10 is directly associated with memory and automatic sorting control to be described later.

Cartons flow passing the photo detecting station next enters a "live roller" or a cumulation section 9 and then a brake belt conveyor 11. These are located immediately ahead of a jib crane 12. The brake belt 11 is so interlocked with the crane 12 as to hold or arrest the flow of cartons on the live roller section whenever the jib crane conveyor belt 13 is stopped. A flexible or "alligator" type conveyor 14 section is incorporated with the jib crane 12. This is for the purpose of directing the carton flow from a fixed incoming conveyor section 15 to a movable tail piece 16 of the jib crane.

The jib crane conveyor 13 itself consists of two belt sections: the horizontal belt 16 that is positioned by the crane to project a radial line to the desired horizontal row of the magazine 17 and a long hinged belt section 16*a*, which, although kept in the same projected horizontal alignment as the short section, is free to be positioned vertically to discharge into any vertical row of the magazine 17. This belt operates at a higher speed to accomplish carton separation or spacing for photo detection at the end of the crane.

The crane 12 is shown pivoted and supported at a center post 18. It is also shown supported at about its three-quarter point by a truck (not shown) operating on a section of circular monorail track 19. This truck carries a two-speed motor drive. Vertical motion of the crane is accomplished by a two-speed hoist drive. The horizontal and vertical drives are controlled by independent sets of conventional automatic elevator equipment (not shown in FIG. 1).

At the tip of the conveyor boom, a detection device (described infra) such as photo transistor detection cell for example, is located and serves to initiate product identification, to activate dispatch circuits as well as to permit error checks of certain equipment performance and dispatch board programming. Other detection cells are provided to increase the scope of mal-function checks. Cartons in this instance enter the magazine storage system 17 on skate-wheel intake plates 20. The leading edges of these plates form a modified inside spheroidal surface to provide essentially uniform clearance for the end of the jib crane boom 12 as it swings through all composite positions of travel.

The magazine system 17 comprises a plurality of conveyors arranged in horizontal and vertical rows having an inlet of the modified spheroidal surface above mentioned. These magazine conveyors are for in-transit storage. From the magazine conveyors the cartons may be delivered to on-floor storage 21, railroad docks 22 or truck loading docks 23.

The automation feature of the system which will now be described is concerned with the storing and memorizing of the sequence of carton flow to the jib crane 12, product identification at the crane 12, and dispatch from the crane to the respective locations in the magazine conveyor system 17 in accordance with a pre-set product storing schedule. Discharge of cartons from the magazine storage to the shipping docks 22—23 is by manual direction in accordance with railroad and truck loading orders.

*Block Diagram Illustration of the Control System for the Conveyors*

Figure 2:
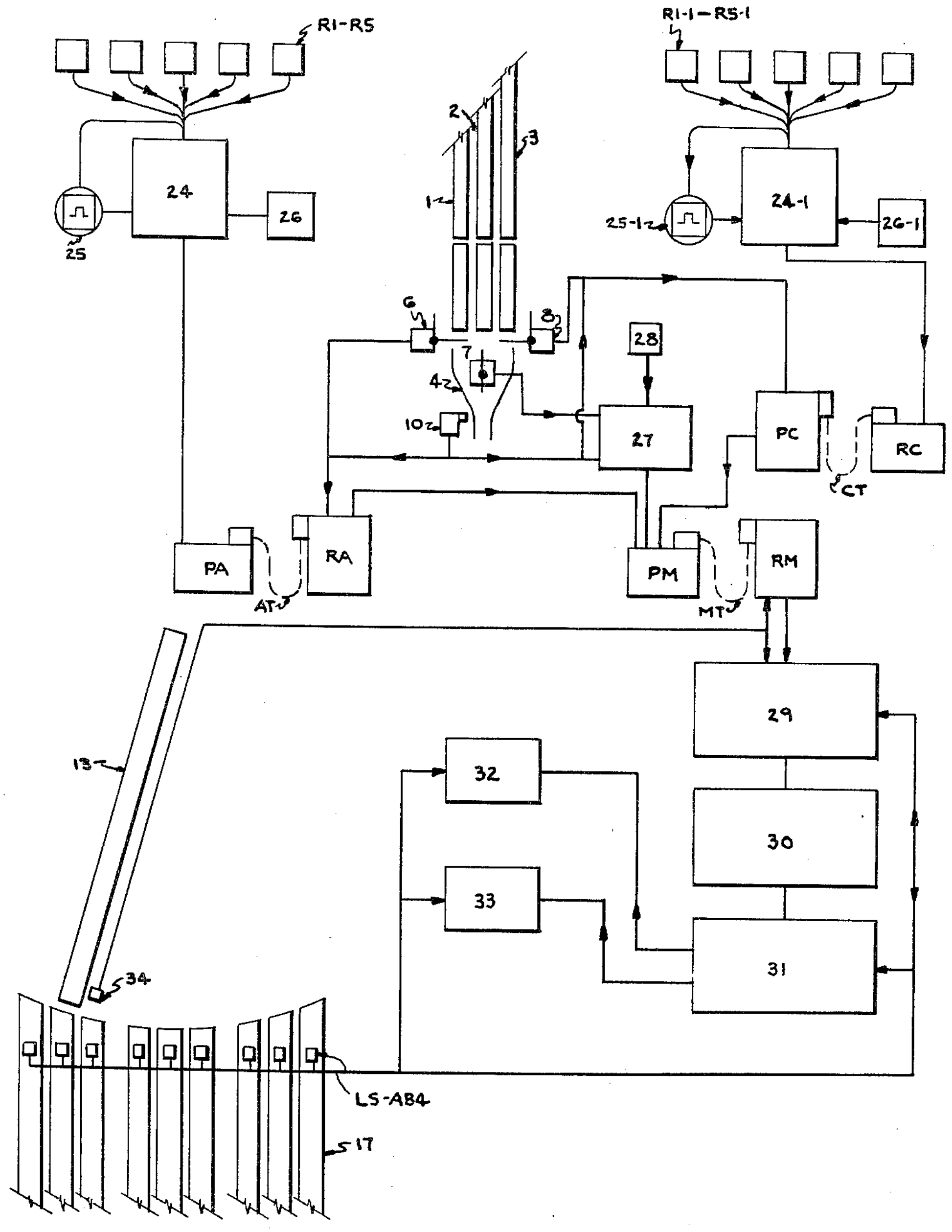
FIGURE 2 is a schematic block diagram of the control system, the warehousing device and magazine conveyors.

FIG. 2 illustrates schematically by block diagrams the control elements involved for effecting complete and fully automatic control of the handling of packages from one or more departments to the storage magazines.

In Department A, since there are five lines in this example, there are five automatic line release switches, R1–R5 which deliver electric signals to a circuit 24 for coding the production sequence of those lines. The coding device is shown more in detail in FIG. 4. It operates in conjunction with a pulse generator 25, which receives an energizing signal in the form of a current input from the line release switches R1–R5. The pulse generator 25 is shown more in detail in FIG. 6, and will be described infra. That device is so arranged that it can generate one or more output signals. In the particular system shown, generator 25 delivers three spaced output pulses per operation of the line release switches R1–R5. Also associated with the coding device is a program time clock 26, the function of which is to code time signals on the code tape AT.

The coding circuit transmits the same number of signals as is delivered to it by the pulse generator 25—in this case three—to a recording device PA. In this example, the device PA is a punch which perforates the tape AT in accordance with the pre-arranged code pattern. A magnetic or other tape on which codes can be stored in sequence could be used. The tape AT as shown passes from the punch to a tape reader RA for subsequent transmission of the code information to a master recording tape MT. The control system is so arranged that when there is no slack in the tape AT between the recorder PA and the reader RA, flow of production out of line 1 of the merge station 4 is blocked, allowing goods to accumulate on the individual line 1 leading to that station. While the goods are accumulating, a slack portion develops in the tape AT.

The products from Department B pass over a conveyor 2 to the merging station 4. The goods delivered from that department are coded when the packages therefrom pass the photo station 10 immediately downstream from the gates 6, 7 and 8. The coding is accomplished by means of a coding circuit 27, the output of which is delivered to the master tape recorder PM causing it to perforate the tape MT in accordance with the pre-selected code pattern for Department B products when released by gate 7. Associated with the coding circuit is a multiple position selector switch 28 which permits a multiple selection of codes for Department B production.

As shown, the components utilized for recording on Department C tape are the same as for Department A; therefore, those components are identified by the same reference characters with primes affixed.

The master tape MT is delivered to a master tape reader RM that controls the operation of the jib crane 12. As in the case of the recorder PA and reader RA of Department A, the punch PC and reader RC of Department C and the tape MT of the master tape recorder PM are designed to include tight tape control.

Department C tight tape control causes the same operation of the C line merge gate 8 as the Department A tight tape causes on gate 6. The master tape MT tight tape control causes the jib crane belts 13 to stop until a predetermined number of cartons accumulate between the crane 12 and the merge station 4.

As stated above, the gates 6, 7 and 8 controlling flow on the carton lines at the merging station 4 are so interlocked that no one of them can be opened until the others are closed and a sufficient time interval has elapsed to have the trailing product clear the photo detection cell. Assuming that the gate 6 controlling the line 1 is open, cartons flow through it to the single line conveyor 9 leading to the jib crane conveyor 13. These cartons pass the photo cell detector 10 which, in conjunction with a switch AGO in the gate 6 which signals the gate is open, develops and delivers an impulse to the tape reader RA for line 1. The tape reader RA transmits impulses to the master tape punch PM causing it to reproduce the coded information from the tape AT for line 1 as each carton from line 1 passes the photo detection device 10. Under these conditions the master tape punch PM forms on the master tape MT identical coded information as is punched on the tape AT concerning those cartons which are releasing at that time from line 1. Similarly, when gate 8 is open, it reproduces on the master tape MT information for those cartons which are released from line 3 in accordance with the codes punched on the tape CT.

Therefore, the master tape punch PM will produce on the master tape MT the coded information contained on tapes AT and CT including codes produced by the coding circuit 27 associated with line 2 when gate 7 is open. Thus, the code information on the master tape MT is a faithful representation of the sequence of product flow over the single conveyor line 9 leading to the jib crane.

Associated with the master tape reader RM are decoding control and protective circuits indicated in block 29, a bank of product identification relays identified as block 30, a magazine loading plug board block 31 and jib crane vertical and horizontal control devices indicated by blocks 32 and 33. Also associated with the jib crane controls blocks 32 and 33 and the decoding control and protective circuits of block 29 are a plurality of magazine limit switches LS–AB4 which are located at the entrance to the various magazine storage conveyors 17. Also associated with the master tape reader RM and the decoding control and protective circuits 29 is a photo detector station 34 located relatively close to the end of the jib crane conveyor 13. As each carton enters the photo detector station 34 a signal is delivered to the master tape reader RM and to the decoding control and protective circuits of block 29.

The decoding control of block 29 decodes the master tape MT in accordance with the product flow at the photo cell 34. The protective circuits of block 29 operate to stop the jib crane conveyor 13 in the event of mal-function. The decoding control signal delivered to the product identification relays of block 30 determines where the jib crane 12 is to be positioned for delivery of products to the selected magazine storage stations 17 for the particular product at the photo detection station 34. The impulses from the product identification relays 30 that accomplish this purpose are delivered to the magazine loading plug board 31. That board determines the particular operational function of the jib crane conveyor 13 by positioning it to the proper elevation and horizontal position by means of the jib crane vertical 32 and horizontal 33 control blocks.

The limit switches LS–AB4 function each time a carton passes over them. If, for any reason, a carton remains on a limit switch LS–AB4 more than a predetermined length of time, a time circuit not shown in the block diagram of FIG. 2 causes the jib crane conveyor belt 13 to stop and the jib crane 12 through the magazine loading plug board 31, to take another pre-selected position where a magazine 17 is available for receiving cartons.

The cartons traveling on the jib crane conveyor 13 are spaced from each other by virtue of the fact that its belt **16*a* travels faster than the tail section belt 16 which delivers cartons to it. This spacing is necessary in order to allow the photo detection station 34 to function properly and also to allow the timing out features of LS–AB4 to function normally. If the spacing of cartons on the jib crane conveyor belt 13 is too close, device 34 cannot distinguish each carton. Therefore, RM will not index in accordance with the actual number of cartons passing 34**.

In the following the various circuit components involved in this system will be described under head notations so that the various components beginning with the originating departments through to the jib crane control will be described in that order.

*Automatic Line Release Circuit at Department A*

In advance of the automatic line release switches R1–R5 indicated in the block diagram of FIG. 2 are a series of limit switches LF1–LF5, one for each line of Department A and downstream of those limit switches are paddle wheels PW1–PW5 in each line. This configuration is shown in FIG. 7. LF1–LF5 are actuated by packages flowing under them. When a package stops on any one of LF1–LF5 for a predetermined length of time, a time relay TR1–TR5 functions to indicate that a certain number of packages are ready to be released to the release line controlled by R1–R5 in the block diagram in FIG. 2. Wheels PW1–PW5 located downstream of LF1–LF5 count the number of packages released as well as acting as a brake to the package flow. PW1–PW5 are so arranged that it takes four packages to turn them one revolution and with each revolution a counting limit switch of the series CL1–CL5 is actuated to count four packages. When a certain number of packages have been counted, say for example 144, a counter CT operated by the appropriate switch CL1–CL5 stops the line behind it. When that line has been stopped another line is released provided there are 144 packages, for example, behind the wheel in that line.

The released packages go to a carton stuffer of conventional form.

Figure 3:
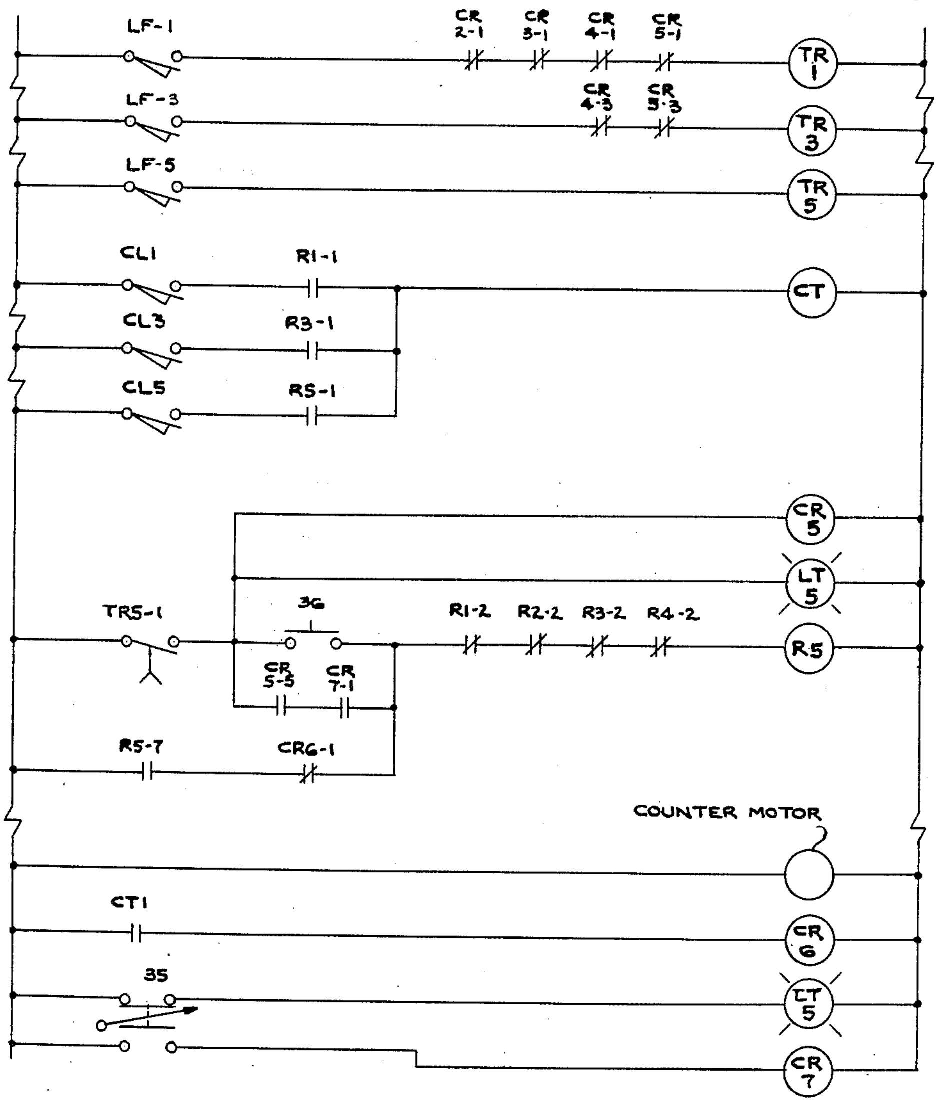
FIGURE 3 is a schematic of the control circuit associated with the release lines for the production departments.

A feature connected with the release line controls of FIG. 3 ahead of the carton stuffer is that it may be arranged to release lines having the shorter accumulating space first. The sequence of release can be predetermined.

When cartons or carton shells, so called, have been stuffed with packages from the individual package lines, the cartons flow onto line 1 and are transported to the merging station 4 or to the jib crane 12 if only one package area is employed or if only one package area of a number of areas is in operation.

FIG. 3 illustrates schematically the circuits which include LF1–LF5 switches, the CL1–CL5 switches operated by wheels PW1–PW5 and other control relays utilized to obtain the above described operation, and will be described as follows:

The circuit in FIG. 3 shows LF1–LF5, but the switches for lines 2 and 4 have been omitted because they are the same as the others except for the modification which will be described. In the circuit controlled by LF1 are a plurality of normally closed contact members CR2–1—CR5–1 and a timing relay TR1. In the LF2 circuit there is a TR2 and contact members from the same coils as for the LF1 circuit except the CR2–1 relay contact would be omitted. In the line containing LF3 are contact members CR4–3 and CR5–3 and TR3. The circuit for LF4 is not shown as it would be the same as the preceding line except that it would have one contact therein, i.e., contact CR5–4 and TR4 coil. The line controlled by LF5 contains only TR5 coil. Since the line in which LF5 is located has no normally closed switch CR2–CR5 and the others are provided with 1, 2, 3 and 4 contacts respectively, it follows that the line 5 limit switch LF5 will operate with preference over the others since these relay contacts CR2–CR5 open when a line is ready to release.

The circuit also includes a counter clutch coil CT controlled by the wheels PW1–PW5 operated counting limit switches CL1–CL5. These switches are connected in series with R1–1—R5–1 respectively, so that the circuit to coil CT can be controlled by any one of CL1–CL5 provided its associated contact R1–1—R1–5 is closed. If it be assumed that LF5 is closed and TR5 has been energized, timing relay contact TR5–1 is closed, thereby energizing CR5 and an indicating light LT5.

In the circuit of FIG. 3 there is a control switch 35 for either automatic or manual operation. It controls, when in automatic position, a relay CR7.

The timing relays TR1–TR5 control the CR1–CR5 relays by a circuit which is shown typically for the CR5 relay. The relays R1–R5 control the release of paddle wheels PW1–PW5 in the five lines. R1–R5 coils have in series therewith normally closed contact members from all R1–R5 relays except that it has none for its own coil. Therefore, as shown R5 has R1–2—R4–2 in series. R4 has R1–3—R3–3 and R5–3. R3 has R1–4, R2–4, R4–4 and R5–4. R2 has R1–5, R2–5, R4–5 and R5–5. R1 has R2–6—R5–6 in series therewith.

Assuming that LF5 is closed and the other lines 1–4 have not been released, and TR5 has been energized to close TR5–1 relays, CR5 and R5 will be energized through contacts CR5–5 and CR7–1, the system being on automatic so that CR7 is energized. R5 releases wheel PW5 associated with line 5. Counter clutch CT is energized through CL5 and the R5–1 each time wheel PW5 makes one complete revolution. It continues to rotate until a predetermined number of packages have passed PW5, at which time PW5 is stopped. When relay R5 was energized through the contacts TR5–1, CR5–5 and CR7–1, contact R5–7 in series with a normally closed contact CR6–1 was closed, providing a holding circuit for the coil of R5. As the packages began to flow from line 5 the package engaging LF5 no longer engaged it, and TR5 was deenergized whereupon TR5-1 opened. Thus, the latching circuit is necessary and when the counter has counted out the number of packages required, counter contact CT1 closes energizing relay CR6. CR6 has a normally closed contact CR6-1 in series with the latch or holding circuit for relay CR5. Therefore, when CR6-1 opens, CR5 and R5 are de-energized thereby stopping wheel PW5 and preventing further flow of packages past it. Also when R5 is de-energized R5-1 is opened, de-energizing counter clutch CT and resetting the counter. The R5 contacts R5-2—R5-6 in series with the other R relays close to permit another wheel PW to release should it be ready. The functioning of the circuits in which LF1-LF4 are located is the same as the described in connection with the operation for LF5.

The circuit above described is selective in that if, for example, should timer TR3 be energized signalling wheel PW3 is ready for release before wheel PW5 is ready, PW5 will take preference over it when TR5 is energized to energize relay CR5. Thus, CR5-3 in series with TR3 will open and de-energize TR3. Therefore, wheel PW3 will take preference. This is true, of course, only if R3 has not been energized to release PW3. It takes preference over other lines also because they have CR5 closed relay contacts in series with their respective timing relays. Also as is shown in the circuit for the energization of R5, there are normally closed contacts R1-2—R4-2 in series. Therefore, if any other line is open one of the these are open and R5 cannot be energized. This feature allows only one line to open at a time.

The circuit also provides for manual release of the lines. With the selector switch 35 turned to manual, relay CR7 is not energized and CR7-1 will be open. Therefore a push button 36 must be depressed to energize R5 relay.

*Coding of Product Sequence Tape Punching Circuit*

Figure 4:
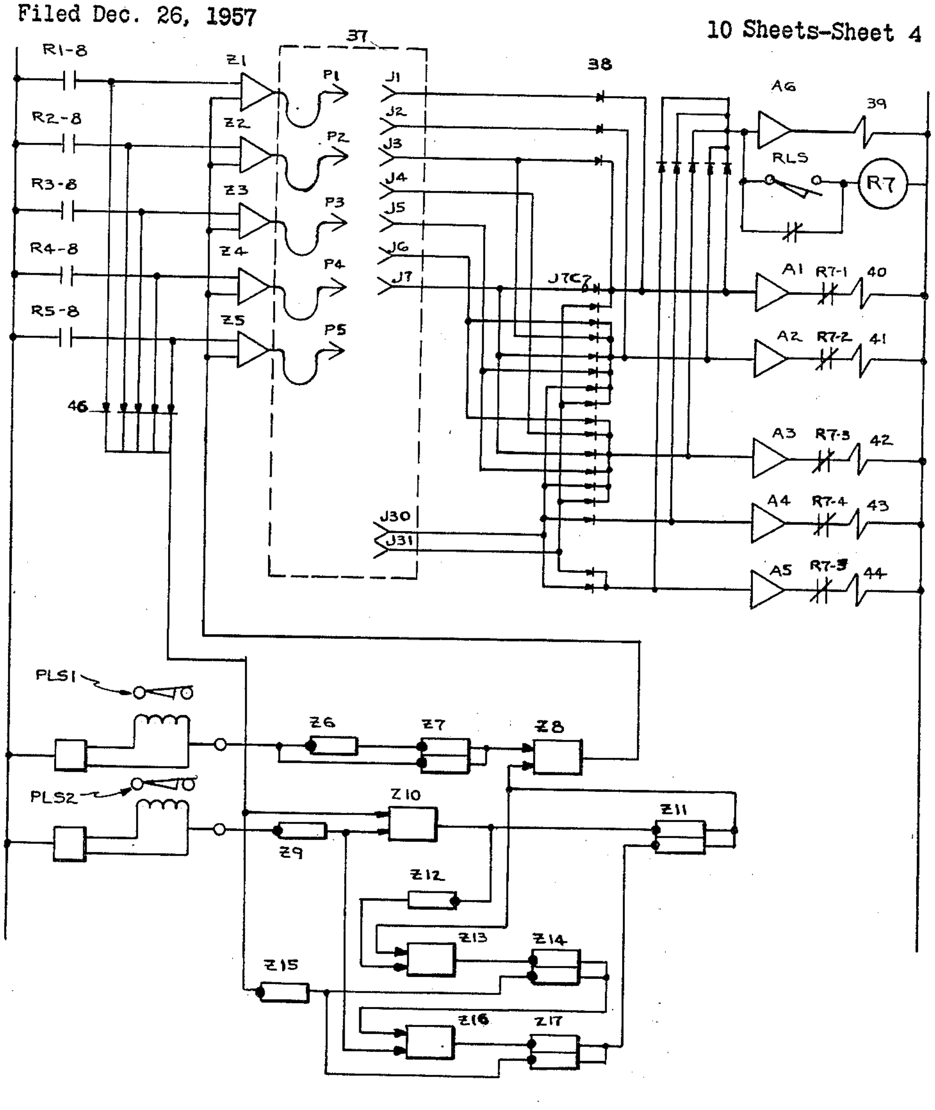
FIGURE 4 is a schematic of the control system that controls the coding of department code tapes.

In FIG. 4 is shown in dot-dash lines a line product selector board 37, having a configuration of product jacks J1-J31, the number of which depends upon the number of products produced in the department in which the selector board is used. Each product or variety is assigned a specific jack J1-J31. The board also contains plugs P1-P5 for each production line in the area.

The input to the production line plug is controlled by a voltage through one of the line release relay contacts R1-8—R5-8 and impulses from a specially designed impulse generator which will be described infra. The line plugs P1-P5 are plugged into the jacks J1-J31 corresponding to the product being manufactured on the line. This results in the energization of punch PA to produce codes on tape AT which correspond to the type or name of the product. The code is punched as many times as there are cartons released because of the influence of the impulse generator in FIG. 6.

Relay contacts R1-8—R5-8 control the input to one terminal of static control elements Z1-Z5 respectively. Z1-Z5 are of the AND type, and must receive two inputs in order to produce an output. The other inputs are derived from an impulsing circuit which is common to all five. The impulsing circuit includes a proximity limit switch PLS1 to be described infra, a NOT Z6, a MEMORY Z7 and a two input AND Z8 static control element. The output from Z8 is common to each of elements Z1-Z5 and constitutes the second input thereto.

Since Z8 is a two input AND device, its second input is derived from a MEMORY Z11 static control device. The input to Z11 from the two input AND device Z10 turns Z11 on, whereby it transmits an input to Z8. When the two inputs are on simultaneously to Z8, an impulse is transmitted to devices Z1-Z5. Assume that the plugs P1-P5 are plugged into selected jacks J1-J31 corresponding to the line production and that contact R3-8 is closed. The particular line 3 plug is plugged into product jack J7. R3-8 selects Z3 as the operating device and the plugging arrangement makes the selected conductor J7C. J7C is common to three amplifiers A1, A2 and A3. These control the punching devices 40-44 by which the products leaving via line 1 are coded on tape AT. The voltages supplied to A1, A2 and A3 are through rectifiers 38 which prevent feedback. A1-A3 control operation of punch PA so that tape AT is coded in accordance with the products originating at Department A in any line. The output of A1-A5 controls punches 40-44 in a conventional paper tape punch shown as PA in the block diagram of FIG. 2.

The punching device PA is of standard construction mechanically. It includes or may embody eight different punches, each controlled by an electro-magnet of the series 40-44 energized by the A1-A5 series of amplifiers. If any one or any combination of these electro-magnets 40-44 are energized, corresponding holes will be perforated in the paper. The clutch 39 which is energized by amplifier A6 connects a continuously rotating motor to a cam shaft in the punch PA which has a series of cams corresponding to the number of electro-magnets 40-44. The cams will release those punches whose electro-magnets 40-44 are energized to punch the paper. The clutch is energized any time any of A1-A5 are energized being tied into the energizing circuits A1-A5 through a serie of rectifiers 45 leading to the energizing line for any one or more of the A1-A5 amplifiers. The rectifiers 45 are provided to prevent feedback to any one of the A1-A5 amplifiers that are not functioning at the moment.

The codes punched on the tape for Department A as well as for Department C are set up on a binomial addition principle as illustrated by FIG. 5. In FIG. 5, the *x*'s represent holes in the tape and the *o*'s represent no holes.

The output of Z8 is controlled by two sets of pulses derived from the pulse generator shown in FIG. 6. That pulse generator comprises a motor 47 having mounted on the shaft thereof a non-magnetic disc 48, for example, aluminum, on which are mounted, near the periphery thereof, in concentric relation to the center of the motor shaft a pre-determined number of magnetic slugs 49, preferably cast iron. The number of slugs 49 employed near the periphery of the disc corresponds to the number of impulses that are to be delivered to Z6 and Z7 devices per measure of units released from the A department. The term "per measure of units" signifies the number of cartons released in a group from any package line of that department. Therefore, if there are three units, three slugs 49 are employed at the periphery of 48. Also the number of units, so called, released from any one of the five lines of Department A must correspond in magnitude or quantity. Therefore, the number of slugs 49 employed on the periphery of 48 is determined by the number of units released at any one time.

When the cartons are piggy-backed and if, for example, six slugs have been used before piggy-back, then three slugs are used.

There is also provided on 48 a single slug 50 of cast iron or magnetic material located more closely toward the center thereof. Associated with 48 is a stationary support, on which are mounted two proximity switches PLS1 and PLS2. PLS1 functions with slug 49 and the PLS2 with slug 50. PLS2 is the start-stop switch connected to NOT device Z9. PLS1 is connected to the NOT Z6 and MEMORY Z7. Both PLS1 and PLS2 act like normally closed contact switches although they have no contacts. Therefore, when the slugs 49-50 come in proximity with their corresponding switches, PLS1, PLS2, voltage is removed from the Z6, Z7 and Z9 devices. When voltage is removed from NOT Z6, it produces an output thereby delivering an input signal to and turns on the MEMORY Z7. Since the impulse switch PLS1 acts like a normally closed switch, no voltage is delivered to the second portion of Z7, which section acts to turn the MEMORY off. Therefore, there is output from Z7 because of the input from Z6. When the impulse switch PLS1 is no longer in proximity with its slug 49, voltage is applied to the second portion of the MEMORY Z7; and to the NOT Z6 device since PLS1 acts as a normally closed switch. This turns off both the MEMORY Z7 and the NOT Z6. The proximity switch PLS2 which is represented in FIG. 4 as a start-stop switch removes voltage to the Z9 NOT device. Therefore, there is output from that device to the Z10 AND device, whenever the switch is operated. Z10 also receives voltage from any one of the contacts R-8—R5-8 through the rectifier matrix 46. That matrix prevents feedback from any one of the lines to any other line. Thus, when any one of the relay contacts R1-8—R5-8 is closed, a second input is delivered to AND Z10 and, when there are two inputs to it, there is an output to the Z11 MEMORY device which allows the pulses from the Z8 AND to occur whenever there is an impulse through the proximity switch PLS1. This results in a series of pulses each time a line release relay (R1-R5) is energized. The output from Z8 is the second input to the selected AND Z1-Z5. Therefore, whichever one of the Z1-Z5 devices is energized through a relay contact R1-8—R5-8 delivers a signal through its associated plug cord P1-P5 and jack J1-J31 to the particular electro-magnet or magnets 40-44 of the punch PA which is to be actuated by that signal. The number of impulses delivered from the Z8 device will correspond to the number of slugs 49 at the periphery of the rotating disc.

The Z8 device continues to transmit impulses until the disc has made 360 degrees of revolution for each operation of contacts R1-8—R5-8, at which time the start-stop proximity switch PLS2 on the disc is again operated to turn off MEMORY device Z11. When Z11 is turned off, there is only one input to device Z8, and there is no output from that device.

When the slug 50 leaves the start-stop proximity switch PLS2, voltage is on the Z9 device; therefore, there is no output from Z10 device to Z12 NOT. Z12 will have an output which is delivered to the Z13 AND device. Since previously Z11 was on, there will be two inputs to Z13 and it delivers an output to the Z14 MEMORY device. Z14 is now on thereby delivering an output to the Z16 AND device. Therefore, the next time the switch PLS2 is energized Z9 will transmit an output an AND Z16, giving two inputs and an output to the Z17 MEMORY device. The output of Z17 clamps Z11 MEMORY to "off" condition. Therefore, the output of Z11 is removed from Z8 and the impulses from it to the functioning Z1-Z5 device is turned off. The moment the contact in the R1-8—R5-8 series which was closed opens, the voltage to the Z15 NOT device is removed. Thus, Z15 has an output to Z14 and Z17, turning them off, removing the voltage which had previously clamped off the MEMORY device Z11. This sets up the circuit to operate the next time one of the contacts in the R1-8—R5-8 series closes.

Included as a feature in all tape punches utilized in the system, but shown only for the Department A punch PA, is an anti-repeat relay R7 having contacts R7-1—R7-5. A contact from this relay R7 is in series with each of the punch electro-magnets 40-44. When the punch clutch 39 has been energized the cam shaft in the punch begins to rotate and, at about 180 degrees of rotation, a cam on the shaft operates limit switch RLS for about 30 degrees of rotation. This switch energizes the relay R7 and a contact R7-6 closes around RLS to keep the relay energized as long as the voltage is applied to clutch 39. Normally closed contacts R7-1—R7-5 open and de-energize the electro-magnets 40-44 which had been energized.

The cam shaft will continue to rotate and index the tape as long as the clutch 39 is energized, but no code holes will be punched because the circuits to the electro-magnets 40-44 are open and will remain open until the clutch energizing voltage is removed to de-energize relay R7. This feature provides more tape for a given number of cartons in transit.

The punch utilized is disclosed in Commercial Controls Corporation Bulletin SP-8590R2 and the reader described herein is shown and described in Bulletin SP-8602-R3 published by Friden Calculating Machine Company, Inc. The punch and reader structures are incorporated herein by reference to those bulletins.

The foregoing described circuit functions to so control the electro-magnets in the punch that the tape AT will have punched holes therein corresponding to the code information required for the packages that have passed to the stuffer.

*Release of Gates at Merge Station and Transfer of Code Information From the Tape AT to the Tape MT*

Figure 8:
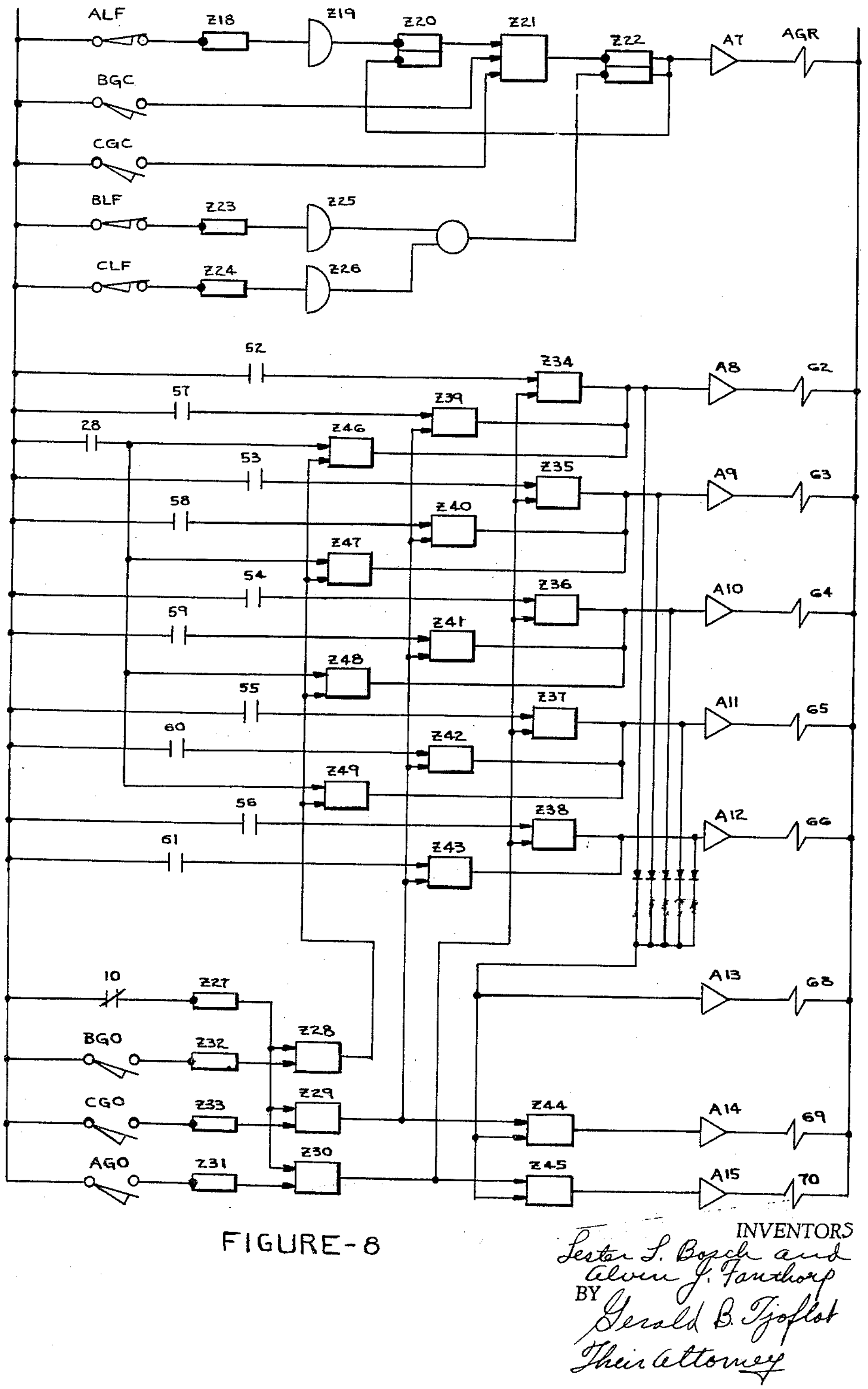
FIGURE 8 is a schematic illustration of the control circuit for opening gates at the merge station and for transferring code information from department code tapes and another line, absent a code recorder, to a master tape recorder.

FIG. 8 illustrates schematically a circuit for the operation and control of the gates 6, 7 and 8 at the merging station 4, and the circuit for control of the master punch PM.

It will be understood that the gates 6, 7 and 8 swing on pivots. When released they are opened by carton pressure against them. They are returned to closed position when not actuated by cartons by a spring and are latched by a latch pin which is operated by a solenoid AGR.

The circuit controlling the gates 6, 7 and 8 comprises a line accumulation switch ALF, which is normally closed, but opened each time a box passes under it; a NOT device Z18; a static timer Z19; a MEMORY device Z20; an AND static control device Z21, a MEMORY device Z22; an amplifier A7; and the gate latch pin solenoid AGR. The circuit also includes an interlock circuit for the B and C gates 7, 8. The gate interlock circuits include normally open switches, BGC and CGC, one for each gate, which are held closed when the gates are closed. When closed, they deliver impulses to the AND device Z21. The circuit also includes means for closing gate 6 and latching it closed. That portion of the circuit includes the normally closed accumulation switches BLF and CLF, NOT devices Z23 and Z24, time delays Z25 and Z26 and rectifiers 51. BLF and CLF are operated by cartons flowing in the respective lines 2 and 3 of merge station 4.

The circuit for controlling gates 7 and 8 would be constructed in the same manner as the circuit for gate 6, with this exception: In constructing gate 7 circuit, all switches for gate 6 are replaced with the equivalent gate 7 switches and all gate 7 switches with the equivalent gate 6 switches. The gate 8 switches remain as shown. For gate 8 circuit, the 6 and 7 gate switches are interchanged.

Assume that each of the gates 6, 7 and 8 at the accumulating station 4 is closed and there is an accumulation in line 1 actuating line 1 back-up switch ALF. Therefore, as there is zero input to the Z18 NOT device, it will have an output to the timing device Z19. After a certain length of time has elapsed, Z19 will deliver an input to the Z20 MEMORY device, which turns it on and provides an input to the AND device Z21. Since it has been assumed that gates 7 and 8 are closed, the switches, BGC and CGC will be closed thereby providing the additional inputs required to operate AND device Z21 and deliver an input to the MEMORY device Z22. Z22 turns on and delivers an input to the amplifier A7 which, in turn, energizes the solenoid AGR of gate 6, releasing the latch and allowing carton pressure against the gate to open it. Gate 6 will remain unlatched whether or not cartons are flowing through it until there has been an accumulation in either or both of the other lines 2 and 3 sufficient to actuate the accumulation switches BLF or CLF. The first one of these switches to be actuated to open position will determine which of the gates 7 or 8 will open. If the backup switch BLF is opened first, an impulse will be delivered from the NOT device Z23 to the timing device Z25 and then to the bottom section of the MEMORY Z22 device, which turns it off and removes the input to the amplifier A7 and to gate 6 solenoid AGR, thereby latching it closed. As soon as gate 6 has closed and has operated the gate switch AGC which is closed when the gate is closed, a circuit similar to the one above-described for gate 6 is initiated and it functions in the same manner to energize the solenoid BGR that releases the latch of gate 7. The cartons then flow through gate 7 until there are no more cartons to hold that gate open in which event it closes and is latched closed because it has been assumed that line 3 also had an accumulation of cartons back to the accumulation switch CLF. Therefore, gate 7 is latched closed since the timer Z26 has already been timed out. Thus, gate 8 will immediately open by being unlatched through the energization of the latched solenoid CGR. The cartons will, therefore, travel through gate 8. Gate 8 will remain open so long as there are cartons to keep it open, but will swing closed when carton flow is interrupted. It will not be latched closed until one of the other gates 6 or 7 is ready to open.

The master punch circuit operates in conjunction with the tape readers RA and RC and the Department B control switch 28. The readers RA and RC, together with the Department B control switch 28 function jointly to produce the master tape MT through the control of the merge gate switches AGO, BGO and CGO and the photo cell PCS. AGO, BGO and CGO switches are held closed when their respective gates 6, 7 and 8 are closed.

As shown in FIG. 8, tape reader RA is provided with normally open contact switches 52–56. Tape reader RC is also provided with a plurality of normally open switches 57–61. Both correspond in number to the number of channels utilized on their respective tapes AT and CT. The switch 28 is a multiple position selector switch which can set up a plurality of codes, corresponding to the number of switch positions provided for carton flow through gate 7. Only one position of this switch is shown.

Each reader switch 51–61 corresponds to a tape channel on its respective reader RA and RC and the contacts 51–61 will be closed if there is a hole in the tape AT or CT at its respective channel. Associated with the master punch control circuit are normally open gate switches, AGO, BGO and CGO, which are open when their respective gates are open, and a photo cell operated normally closed switch 10, which is open when the light source for the cell is blocked. Suppose the photo cell 10 light source is blocked by a carton flowing through gate 6. The photo cell contact 10 opens and turns on NOT Z27 providing one input to ANDs Z28, Z29 and Z30. Gate switch AGO is open and turns on NOT Z31 providing a second input to turn on AND Z30. This AND device signals a carton from gate 6 and selects the reader RA code as the one to be transferred to the master tape MT. Its output is connected to the input terminals of the two input AND devices Z34–Z38.

The two input AND devices Z28, Z29 and Z30 select either the gate 7 selector switch 28, the reader RA or the reader RC, according to where the carton flow originates. Since the two input AND devices Z39–Z43 require two inputs, they will not function unless gate 8 is open and Z29 device is on. Similarly gate 7 switch 28 cannot function unless gate 7 is open. Thus, if tape AT has a hole punched in Channel 1, there will be two inputs to the two input AND device Z34, which turns on amplifier A8 and energizes the electro-magnet 62 that controls the Channel 1 punch of the master punch PM. The same voltage which energized the amplifier A8 is connected through a rectifier matrix 67 to the amplifier A13 which energizes the master punch clutch 68 which cycles the punch through amplifier A13 in the same manner as described for the department punches, and to the two input ANDs Z44 and Z45. The two input AND Z30 previously described provides a second input to Z45 to energize reader RA, clutch 70 and index the tape to the next code. If switch 52 of reader RA is again closed, another impulse will be delivered to the electro-magnet 62 of the master punch, provided the photo cell 10 has been blocked a second time and gate 6 remains open.

Assuming that there is a continuity of flow of products corresponding to switch 52, a corresponding hole will be punched in the tape MT by the master punch PM for each carton.

Assume that the product has been changed from that corresponding to switch 52 to a product corresponding to switches 52 and 54. Gate 6 remains open and the photo cell 10 light source is again blocked. There will then be two inputs to the Z34 and Z36 devices and the electro-magnets 62 and 64 of the master punch will be energized through amplifiers A8 and A10. Holes will then be punched in Channels 1 and 3 for that particular product. If all five of the tape channel switches are closed, there will be two inputs to each of the two AND devices Z34–Z38. Therefore, electro-magnets 62–66 which release the punches for Channels 1 to 5 of the master punch PM will be released and the tape MT will be perforated with holes in all five channels.

The tape is indexed in the reader by an advancing mechanism coupled to a drive motor by an electro-magnetic clutch. The clutch in the readers RA and RC, when energized, engages a motor driven shaft on which there are pins that engage drive holes in the tape to advance it. (See Bulletin SP–8602–R3 supra). The motor operates continuously, but the tape is not advanced unless the electro-magnetic clutch is energized as above stated. The switches 52—55 in reader RA and 57–61 in reader RC are operated by the respective tapes AT and CT. These switches close whenever there is a corresponding hole in the tape. Therefore, from the foregoing it will be seen that the master tape is punched to conform precisely with the code information on all of the channels of the tapes AT and CT. Master tape MT is utilized to control the operation of the jib crane 12.

Since production from Department B may not be as diversified as production from the other areas, a punch and reader is not necessary for recording the sequence of cartons on line 2 to the merging station 4. Normally one product is produced in Department B and the circuit in FIG. 8 is shown for one product only. It is possible to produce more than one product in this area, but the shipping cartons utilized for each product must be of different sizes. For line 2 there is a multiple position selector switch 28, each position of which corresponds to a definite code assigned to B department production. Therefore, when gate 7 is open, opening limit switch BGO, AND device Z28 will be turned on each time a carton blocks photo cell 10. The output of AND device Z28 is connected to one terminal of ANDs Z46–Z49. One of the positions of line 2 selector switch 28 is shown in FIG. 8 as a normally open contact and is connected to ANDs Z46–Z49. Other positions are available on this switch and are connected to other combinations of the AND Z46–Z49 devices. Therefore, when AND device Z28 is energized and selector switch 28 is in the position shown in FIG. 8, ANDs Z46–Z49 will have an output, which is connected to amplifiers A8–A12. Therefore, electro-magnets 62–66 are energized and holes are punched in the corresponding channels on the master tape MT. Since there is no punch and reader connected with line 7, no circuit is required for indexing the reader.

*Jib Crane Control and Protective Circuits*

The jib crane control and protective circuits embody five cooperating circuits: (1) The indexing of the master tape; (2) Decoding of the code punchings on the master tape; (3) Positioning of the boom of the jib crane to first choice locations according to the pattern of the decoded master tape; (4) Transferring of the jib crane boom to second or subsequent choice locations in the magazine storage when the first and subsequent choices are filled; (5) Malfunction of the apparatus from the merging station to the jib crane boom.

The mal-function circuit includes three circuits which produce the same end result, that is, the stopping of the belt on the jib crane until the cause that produced the malfunction has been corrected. The first circuit in the malfunction control would operate to stop the jib crane belt when there is no magazine location called for by a carton at the photo detection station at the crane. The second circuit would function when cartons on the jib crane belt jamb together. The third circuit would function when packages of one size are being delivered and the master reader is identifying a different size carton.

*Jib Crane Control*

In the jib crane control the master tape is first indexed and the circuit for the indexing of the master tape is shown in FIG. 9. That circuit includes a photo transistor detector PS5 which is a part of photo station 34 shown in FIG. 2, a Z50 NOT device, a Z51 MEMORY device, an amplifier A16 and a master reader clutch electro-magnet 71 which engages or disengages the indexing mechanism from the motor-driven shaft. That shaft contains a sprocket which advances the master tape MT. When the light source to the photo transistor PS5 is blocked, its resistance rises to a very high value thereby removing the input voltage to the NOT Z50 turning it on. Its output turns on the MEMORY Z51 and energizes amplifier A16. The electro-magnet 17 from the master reader clutch is energized to engage the motor-driven shaft, advancing the master tape. Between the amplifier A16 and the electro-magnetic clutch 71 of the master reader is an anti-repeat normally closed relay contact R6–1. The coil of this relay R6 is in parallel with the electro-magnet 71 of the master reader clutch. Connected in parallel with the normally closed contact R6–1 are a plurality of normally closed reader switches 72–76 which, like switches 52–61, are operated by holes in the paper tape. Thus, when the electro-magnetic clutch of the master tape reader is energized the relay R6 is also energized and contact R6–1 opens. As long as all of the normally closed pin switches 72–76 are closed, the clutch 71 will remain energized and the tape will be advanced. The tape MT will continue to advance until one of the five channel switches 72–76 registers with a perforation in the tape. The moment that occurs, one of the normally closed contacts 72–76 opens, thereby simultaneously de-energizing the relay R6 and the electro-magnet of the clutch to stop the indexing motion.

The circuit therefore provides for the indexing of the tape from one set of code holes to the next. The same indexing feature has been applied to the RA and RC readers.

*Decoding of the Code Punchings on the Master Tape*

This circuit includes normally open reader switches 77–81 from the master reader RM, an AND device Z52, an AND device Z53, an amplifier A17, a product identification relay 7SR having normally open moving contacts 7SR–1 and 7SR–2, two NOT devices Z54 and Z55 and a two input AND device Z56. The code to be described contains a hole in channels 1, 2 and 3 and no hole in channels 4 and 5. This is the seventh code developed by the binomial addition system previously described.

The normally open reader switches 77, 78 and 79 are closed and deliver inputs to device Z52. Reader switches 80 and 81 are open and turn on NOT devices Z54 and Z55 providing two inputs to AND Z56. The output voltage from Z56 is transmitted to the second input of the Z53 device; thus, its output will be supplied to amplifier Z17, and relay 7SR is energized closing its contacts 7SR–1 and 7SR–2. Voltage is applied through these 7SR contacts to the product plug 82 corresponding to product No. 7. The product plug is shown plugged into the magazine jack 83 corresponding to magazine position AB4.

The system embodies a magazine plug board which contains a number of product plugs such as 82 corresponding to the number of codes set up by binomial addition and a plurality of pairs of two circuit jacks such as 83, one pair for each magazine location. The product plug 82 is connected into a desired magazine location jack 83 for locating that particular product in the magazine. One circuit controls horizontal traverse and the other the vertical traverse of the jib crane conveyor 13, by applying voltages to standard elevator controllers 32 and 33.

Two of the plurality of magazine jacks 83, 84, 85 and 86 are shown in FIG. 9. The number seven product plug 82 is plugged into jack 83 dispatching voltages to the vertical and horizontal elevator controllers 32 and 33 through normally closed relay contacts AB4–1 and AB4–2. All of product No. 7 goes to magazine location AB4 until that magazine is full.

*Dispatch of Crane to Second and Subsequent Choice Locations*

As cartons flow down a magazine line they actuate a limit switch near the intake end of the line. Should a carton remain at rest on this switch the magazine is full. The switch for the particular magazine line AB4 is shown in FIG. 9 and designated as LS–AB4. When actuated for a time it energizes relay coil AB4. There is a limit switch and relay for each magazine line.

The circuit for energizing the relay AB4 from its respective limit switch LS–AB4 is common to all relays and switches and contains a static timer Z57, a MEMORY device Z58, and an amplifier A18. When the switch LS–AB4 closes for a time, it turns on the MEMORY Z58 and energizes the relay AB4 through the amplifier A18. Energization of the AB4 relay opens the contacts AB4–1 and AB4–2 between the jack 83 and the elevator controllers and closes the contacts AB4–3 and AB4–4 between the jacks 83 and 84. This shifts the voltages from product seven plug 82 to the jack 84 which is shown jumpered at 87 to the jack 85. Jack 85 is shown connected to the elevator controllers through normally closed contacts CA4–1 and CA4–2 which applies voltage to the controllers 32 and 33 to direct the jib crane 12 to the second choice magazine location CA4. This function is repeated each time a magazine line is filled, using the corresponding limit switch and relay.

The timing circuit comprising devices Z57 and Z58 is common to all limit switches and relays and is connected only to the switch and relay to which the crane is pointing. This is accomplished through the use of sliding contacts in the vertical and horizontal elevator controls 32 and 33. These contacts are made only for the vertical and horizontal position to which the crane is pointing. This circuit is shown in FIGS. 10 and 11 and is self-explanatory. The diagrams show only a portion of the configuration, the remainder being the same for all switches and relays.

Each time the jib crane 12 is required to move, normally closed contacts from the crane drive motor in series with the belt starter open and stop the belt drive motor. The moment the jib crane boom 13 has been positioned to an unfilled channel, the horizontal and vertical traverse motor starters are de-energized to stop the motors. The interlocks close and the belt starts. The belt continues to run until a different product is identified at the end of the crane or the magazine line becomes full.

The operation of the sliding contacts for the commutators for the horizontal and vertical transverse on the jib crane boom and of the commutator operating in conjunction with the limit switches is disclosed in Warner Elevator Company Bulletin Form 278, published April 1954, page 7.

*Mal-Function Circuits*

CARTON NOT IDENTIFIED AT THE DISCHARGE OF THE JIB CRANE

This circuit comprises the photo transistor PS6, a NOT device Z59, a MEMORY device Z60, a static timer Z61, two "two input" AND's Z62 and Z63, an amplifier Z19, a relay 32SR, and a contact 88 and 89 from each of the elevator controllers. The contacts 88 and 89 in the elevator controllers are coil operated. Each time a product identification relay calls for a crane location, these coils are energized. These contacts 88 and 89 operate even though the crane 12 is located at the position called for. The relay 32SR, when energized for any reason, stops the jib crane belt driving motor and sounds an alarm to indicate something wrong. When the light beam to the photo transistor PS6 is blocked, there is an output from the NOT device Z59 and an input to the MEMORY device Z60. If the vertical and horizontal location switches 88 and 89 for the storage channel to which the boom is pointed or to be pointed are closed, two inputs are delivered to the AND device Z63, which turns off the MEMORY Z60. Therefore, no energizing voltage can be supplied to the 32SR relay to stop the belt motor.

If now the situation would arise where the light beam to the photo transistor PS6 is blocked by a carton, but the vertical and horizontal switches 88 and 89 do not close, the Z60 MEMORY device is not turned off, and will deliver an output voltage which provides one input through the timer Z61 to the two input AND device Z62. With only one input to Z62, the relay 32SR cannot be energized. The second input to the Z34 device results when the light source for the photo transistor PS6 is unblocked. The moment that occurs, voltage is applied to the second input of Z62. Therefore, the moment the photo transistor PS6 is unblocked, Z62 has two inputs and an output to the amplifier A19 and the relay 32SR that stops the belt driving motor.

The circuit stops the belt if the reader RM does not read, if the product cord 82 was not plugged in, if a magazine line fills up and no second or subsequent choice magazine location had been selected or if there is any malfunction within the elevator controllers.

CARTONS ARE ABUTTING AT THE PHOTO TRANSISTORS ON THE JIB CRANE BELT CONVEYOR

When a condition arises where cartons are abutting on the jib crane belt at the location of the photo transistor PS6, the light beam for that cell is blocked for a time longer than the normal transit time of any carton. When that condition arises a circuit is energized that operates the relay 32SR and stops the belt motor. This circuit is only effective if the jib crane belt is running. The circuit comprises a belt interlock contact IC, a two input AND device Z64, a NOT device Z65, a MEMORY device Z66, and a timer Z67. When the belt of the jib crane is running and the photo transistor PS6 is blocked off from its light source by abutting cartons, two input voltages are delivered to the two input AND Z64 device. Since the voltage from the photo cell transistor PS6 is off, MEMORY Z66 is turned on by the output from AND Z64. Therefore, it delivers an output to the timer Z67. If the photo transistor PS6 remains blocked for a time longer than the timeout period of the Z67 timer, that timer delivers a voltage to the A19 amplifier which, in turn, energizes the 32SR relay, stopping the belt driving motor. Again an alarm is sounded to indicate a malfunction has occurred. When carton flow past the photo detection station is normal, spacing will unblock PS6 and turn off MEMORY Z66 before the timing element Z67 times out.

CARTONS OUT OF SEQUENCE

As stated supra, the B department normally would be making a product such as biscuits, and that product would be identified on the master tape MT with a particular code corresponding to biscuit production. In order to provide product identification based on size of carton, the photo station 34 near the discharge end of the jib crane conveyor is provided with a plurality of additional photo transistors, for example, two.

To illustrate the basis for the functioning of the circuit in product identification, FIG. 12 shows a single carton of height H, a single carton of height H plus 1 and a piggy-back carton having height 2H. In this view the relative locations of the photo transistors PS5, PS6 and PS7 are shown. For the purpose of mal-function control, the photo transistors PS6 and PS7 operate. The circuit controlled by the photo transistor PS6 is the triggering device for the mal-function circuits, and the PS7 photo transistor functions to identify piggy-back cartons. If the master tape MT code shows that cartons of size H plus 1 are in transit, but that there are actually piggy-back cartons (2H) in transit, the mal-function circuit is energized to stop the belt driving motor and sound an alarm.

The above circuit comprises the photo transistor PS7, a NOT device Z68, a two input AND device Z69, and a two input AND device Z70. The circuit also includes a NOT device Z71, the input of which is connected to the output of the photo transistor PS6. The NOT devices Z68 and Z71 are on whenever both of the light sources to photo transistors PS6 and PS7 are blocked. In that situation there are two inputs to the two AND device Z69 and it supplies a voltage to the two input AND device Z70. Also in this circuit are relay contacts 90 operated by a relay of the 7SR type which has been assigned to biscuits. That contact is closed because the master reader is identifying biscuit. Since that relay contact 90 is closed, two inputs to the Z70 device results. There is then an output to the amplifier Z19 and the relay 32SR energizes. As a result the belt driving motor stops because a piggy-back carton appeared at the photo transistor station 34 when it should have been a biscuit carton.

*General Overall Operation*

In the Departments A, B and C, individual packages of food products of various kinds are formed. The drawings illustrate five product lines for the Departments A and C; whereas, only two have been shown for the Department B. These retail packages, as produced in Departments A and C, move along individual channels and they accumulate at a relay station or at a release location. When the required number of retail packages have accumulated to form a designated number of cartons the release line which has first made its accumulation is released.

However, as the circuit has been illustrated and described, Channel 5 has preference over the other channels in respect to the time of release or the exercise of choice of release if more than one line is ready for release. Once a line is released, the retail packages are transported to a stuffing station where a carton shell is filled with retail packages to the capacity of that carton. Subsequently the cartons are sealed and transported over conveyors from the three Departments A, B and C.

At the time a predetermined number of packages are released to the stuffer, the coding tapes for Departments A and C, when both are producing, are punched to indicate the type of product in accordance with the number of shipping cartons that have been stuffed to the capacity of the respective cartons. Thus, each carton represents units of production of a particular product and those units are registered by punch holes on the tape.

As illustrated the conveyor lines from the production areas to the merging station may be equipped with a machine for piggy-backing cartons. In this case the carton units produced would be half the number of single units and would require half the number of punches on the tape for each release.

The tape puncher used for Departments A and C are standard tape punchers, except modified to incorporate in the electrical circuitry an anti-repeat device which allows each punch magnet to be energized but once independently of the length of time voltage is applied to the magnets and also independently of the number of revolutions of the punch mechanism shaft. This feature causes punched codes to be separated by a number of drive, or index holes, instead of a code punch at each drive hole.

Associated with each tape puncher is a reader to which the former feeds the tape. The reader is of standard manufacture, but modified to read continuously and to index on signal to the next code appearing on the tape independently of the number of drive or sprocket holes which may be intervening. This is accomplished by putting a normally closed read contact from each channel in series and the series circuit in parallel with the standard anti-repeat relay contact. The operation then is as follows: When the clutch is energized and sometime during the first revolution of the punching mechanisms, an anti-repeat relay is operated which would normally de-energize the clutch whether there was a code on the tape at that point or not. The addition of the series circuit mentioned above will overrule this anti-repeat relay contact until a code appears on the tape at the read pins to open one of the read contacts in series.

The punch and reader are separated so that tape can accumulate between them. The accumulation of tape is the measure of accumulation of cartons behind the release gates in the merge stations. The slack feature in the tape permits the release of cartons at the release gate so long as there is slack in that tape. Normally there is a switch at the merge station that is operated when there is a sufficient accumulation of cartons at the merge station. If, however, the tape is tight but there is sufficient accumulation, the release gate for that channel cannot be opened until there has been sufficient accumulation of tape. This condition prevents breakage of the code tape between the reader and the puncher which is an important feature.

The release gates at the merge station are so controlled that only one can be opened at a time and then only if there has been sufficient accumulation behind the gate to actuate the accumulation switch in its line. Once a gate has been opened, the cartons will continue to move through it until another line is ready and a space occurs in the line which has been flowing of sufficient length to permit that gate to close. When that gate closes, it is latched closed and not until that latch has been set will another gate open for a line which is ready to be released.

When two sets of tapes are being punched—one for the A department and one for the C department—they transmit the coded information on them to a master punch tape. The master punch reproduces on the master tape the code information on the Department A and Department C tapes. Any production released from the B line causes the master punch to punch code holes in the master tape corresponding to the size of cartons released and the setting of the selector switches in the release department. Thus, the master tape carries code information for the production from Departments A, B and C in the sequence in which they appear on the single line leading to the jib crane conveyor at the warehouse.

There are controls operating in conjunction with the master tape that operate to detect mal-functioning of the circuits controlling the jib crane belt operation and which also identify products delivered to the jib crane conveyor. In conjunction with the control circuits operated by the master tape are circuits which select the particular magazine channel to which products delivered to the jib crane conveyor are to be delivered for live storage. The controls also include circuits which automatically cause the jib crane to be positioned to pre-selected channels in the order in which they are selected and in the order in which they are filled. Thus, when a selected storage channel is filled the controls for the horizontal and vertical transverse of the jib crane operating mechanism function to position the jib crane to the next choice of storage channel or to subsequent choices avialable and ready for receiving cartons for live storage.

Furthermore, the controls involve circuits which detect the presence of cartons at the discharge end of the jib crane conveyor that should not be there in accordance with the master tape code. When that occurs the belt on the jib crane conveyor is stopped and an alarm is sounded.

Furthermore, if for any reason a selected storage channel is blocked or if there is no space between cartons on the jib crane belt conveyor, the conveyor belt driving motor is stopped and an alarm is sounded so that the condition which produced the mal-function can be corrected.

Thus, the system embodied in this invention provides for the complete, automatic handling of retail packages from retail package size to stuffed carton size and the coding of the cartons according to product all the way to ultimate storage at the storage magazines. The products at the live storage magazines are handled in any manner desired, as for example, they can be delivered for immediate shipment by loading them in trucks or box cars or they may be diverted to on-floor storage as conditions require.

The static control devices disclosed herein, i.e., the NOT, the two and three input AND, and the MEMORY devices, and the static timers and rectifiers are illustrated and described in Westinghouse Electric Corporation technical data Bulletin 52–760, published July 1956, pages 1–8, both inclusive.

While static control devices have been shown, it is to be understood that the equivalent electro-mechanical relays may be substituted for the former. The equivalent relays are given in Bulletin 52–760.

Having thus described this invention, it will be apparent to those of ordinary skill in the art to which the invention pertains that various modifications and changes may be made without departing either from the spirit or the scope of the invention.

Therefore, what is claimed as new and desired to be secured by Letters Patent is:

1. Apparatus for automatically conveying individual packages from a production department to a magazine storage having a plurality of individual magazines arranged in horizontal and vertical rows; said apparatus comprising a plurality of production release lines for the production department, a single conveyor line to which said plurality of release lines deliver packages, line release mechanism for each department release line for developing a release signal, a coding device having means responsive to said release signals for developing output signals, a pulse generator receiving the output signals of said release line mechanism and having means for generating a predetermined number of output impulses per release of each of the several release line mechanisms, a department coding tape, a puncher for receiving coding tape and having means controlled by the coding device signals for indexing and punching code perforations in code channels of the tape, a department tape reader for receiving the tape from the puncher, means for indexing said tape through the reader independently of the indexing thereof through said puncher, means for transmitting output signals from said department tape reader corresponding to the code perforations on the tape, a jib crane conveyor mechanism having a boom provided with horizontal and vertical traverse positioning control mechanisms, and means for delivering signals from the tape reader to said traverse control mechanisms in accordance with the code pattern on said tape.

2. A system as in claim 1 in which a plug board is provided having means for receiving signals responsive to line release and impulse generator signals and, in turn, translating said signals into output code signals corresponding to the units to be handled by the warehousing device, and that the code recorder is provided with a plurality of code reproduction channel means, whereby the code is registered in accordance with said signals.

3. Apparatus for automatically conveying individual product units from a production department to storage facilities having a plurality of locations; said apparatus comprising a plurality of production release lines from the production department, a single conveyor line to which said plurality of release lines deliver product units, line release mechanism for each product release line for developing a release signal, a pulse generator receiving signals of said release line mechanisms, said pulse generator having means for generating a predetermined number of supplementary discrete impulses for each release signal received from the several release line mechanisms, a preset product coding device having means responsive to said release signals and said pulse generator signals for developing coded output signals corresponding to the identity of the product units released from the respective product release lines; a department code recorder having means controlled by the coded product unit output signals for recording said coded signals, a department code reader for receiving the coded record of said signals from the recorder, means for generating output signals from said coded record, a product unit warehousing device provided with means for dispatching product units received from said conveyor line to predetermined locations of said storage facilities according to product unit identity, and provided with product unit detection means and positioning control mechanisms, said positioning control mechanisms operative in response to said generated output signals upon actuation of said product unit detection means to discharge said product units into predetermined storage facility locations.

4. A system as in claim 3 in which a plug board is provided having means for receiving signals responsive to line release and impulse generator signals and, in turn, translating said signals into output code signals corresponding to the units to be handled by the warehousing device and that the code recorder is provided with a plurality of code reproduction receiving channel means whereby the code is registered in accordance with said signals.

5. Apparatus for controlling the conveyance of individual packaged goods as produced in a plurality of departments in controlled sequence to a carton stuffing station for that department and thence by cartons to a merge station from which they are controllably released to a conveyor line leading to a jib crane conveyor having controls for horizontal and vertical traverse whereby the cartons are discharged to preselected storage channels arranged in horizontal and vertical rows; said control apparatus comprising means for selectively releasing goods from the lines of each department to the carton stuffing station in accordance with a predetermined order of accumulation of packaged goods on the individual conveyors therefor, means for developing code signals with respect to the release of goods from each of said department lines, a merge station to which the conveyor line from each carton stuffing station delivers cartons, a pulse generator for each department having means responsive to each line release operation and to the number of cartons produced per line for developing code signals indicative of the kind of product flow from each line and the number of cartons flowing from the stuffer, a code recorder for each department having means for indexing the code recorder in accordance with the individual line release signals and means responsive to the number of cartons produced for recording codes representing each department line product, a code reader for receiving each department code recording and provided with means for indexing the recording therethrough, means responsive to the release of cartons from one of said lines through the merge station to the conveyor leading to the magazine storage for effecting indexing of the reader for that line, a master code recorder and an indexer therefor and a means for activating the indexing mechanism of the recorder in accordance with the indexing of the reader of the respective department code readers and means responsive to the codes on each department code recording for reproducing on the master code recording the code information on department recordings, a magazine storage selector for receiving signals from the master code reader for preestablishing control circuits to which products identified by the master recording shall be delivered for magazine storage and means controlled by signals transmitted through the selector for effecting such control of the traverse motions of the jib crane conveyor as are required to deliver cartons to the preselected magazine storage channels.

6. Apparatus for controlling the conveyance of individual packaged goods as produced in a plurality of departments in controlled sequence to a carton stuffing station for that department and thence by cartons to a merge station from which they are controllably released to a conveyor line leading to a jib crane conveyor having controls for horizontal and vertical traverse whereby the cartons are discharged to preselected storage channels arranged in horizontal and vertical rows; said control apparatus comprising means for selectively releasing goods from the lines of each department to the carton stuffing station in accordance with a predetermined order of accumulation of packaged goods on the individual conveyors therefor, means for developing code signals with respect to the release of goods from each of said department lines, a merge station to which the conveyor line from each carton stuffing station delivers cartons, a pulse generator for each department having means responsive to each line release operation and to the number of cartons produced per line for developing code signals indicative of the kind of product flow from each line and the number of cartons flowing from the stuffer, a code tape puncher for each department having means for indexing a code tape therethrough in accordance with the individual line release signals and means responsive to the number of cartons produced for punching code perforations on channels representing each department line product, a tape reader for receiving each department tape and provided with means for indexing the tape therethrough, means for transmitting an indexing impulse to the reader when a predetermined number of cartons from said carton lines have accumulated thereon, means responsive to the release of cartons from one of said lines through the merge station to the conveyor leading to the magazine storage for effecting indexing of the reader for that line, a master tape puncher having a master tape and an indexer therefor and a means for activating the operating mechanisms for the punches thereof and advancing the master tape in accordance with the indexing of tape of the respective department tape readers and means responsive to the codes on each department tape channel for reproducing on the master tape code channels the code information on such channels, a magazine storage selector for receiving signals from the master tape reader for preestablishing control circuits to which products identified by the master tape shall be delivered for magazine storage and means controlled by signals transmitted through the selector for effecting such control of the traverse motions of the jib crane conveyor as are required to deliver cartons to the pre-selected magazine storage channels.

7. A system for controlling the conveyance of packaged goods produced in a plurality of production departments each of which is provided with a plurality of release lines to a carton stuffer line for the goods of said group of department release lines and thence to an accumulation station for each carton line to which cartons are conveyed; said system comprising means actuated by the release of groups of packaged goods containing a predetermined number of packages per group for establishing signals for each release of packages from each department line, means for developing a signal corresponding to the number of cartons produced in each stuffer and released to the merge station, a code recorder for each department having means for feeding tape therethrough, the recorder having means responsive to the line release and to the carton release signals for recording code information on the tape in accordance with said signals, a department tape code reader provided with means for transmitting signals in accordance with the code on the tape, flow control gates at the accumulator station, means actuated by a predetermined accumulation of cartons at the merge station for preparing a control circuit for effecting opening of the gate for which there is sufficient accumulation, means operated by the other gates for preventing the opening of said first-mentioned gate until said other gates have closed, means actuated by the opening of said first-mentioned gate for indexing the tape reader for the department whose products have been released at the merge station, a master tape recorder for receiving released department carton flow codes for indexing the same, and a master tape reader provided with means for transmitting tape code signals, the system includes a magazine storage station, a jib crane conveyor having horizontal and vertical traverse for positioning the same with respect to magazines of the station and a single line conveyor leading from the merge station to the jib crane conveyor, said control system including means responsive to the master tape signals, horizontal and vertical traverse controls for the jib crane, and means for selectively channeling said signals to the traverse controls to provide a predetermined order of positioning control for the jib crane.

8. A system as in claim 5 in which means are provided for operating the department tape and master tape recorders while the indexing controls for the readers thereof are in non-indexing condition.

9. A system as in claim 5 in which the department tape reader is provided with means responsive to tension in the tape leading from its recorder and which is actuated when that tension reaches a predetermined value to render inoperative the release controls for the respective department carton flow at the merge station, means at the merge station for effecting operation of the tape recorder while cartons flow into the merge station thereby building up slack in the tape between the recorder and reader, and means responsive to a predetermined amount of carton accumulation at the merge station for each department for conditioning circuits controlling release of cartons from the merge station, and means responsive to said carton release for activating the department reader indexing and code transmitting operation.

10. Apparatus for delivering product units to magazine storage and of storing said products by kind therein, said apparatus comprising a plurality of vertically and horizontally arranged storage magazines, a jib crane conveyor having horizontal and inclined motor driven conveyor belts, a conveyor motor drive control, said jib crane having two sections, the first of which has a motor driven horizontal traverse and a second of which has horizontal traverse with the first section and a motor driven vertical traverse relative to the first section, a directional control mechanism for the horizontal traverse motor drive and a directional control mechanism for the vertical traverse motor drive, a storage magazine selector plug board including means for establishing the sequence of filling selected storage magazine locations with respective product units according to a first and subsequent choice of said selected storage magazine locations, and control means responsive to said plug board setting for effecting control of the respective traverse motions of the jib crane conveyor to deliver respective product units to selected storage magazine locations according to said first and subsequent choices.

11. Apparatus as in claim 10, which includes means for operating the motor driven inclined conveyor belt of the jib crane at a higher linear speed than the motor driven horizontal conveyor belt so as to provide spacing between product units on said inclined conveyor belt.

12. Apparatus as in claim 10 in which the upper end of the section having vertical traverse is provided with a photo detection control means for developing and delivering a control impulse to the jib crane belt conveyor motor drive control to stop the same when a trailing product unit abuts a preceding product unit.

13. The combination with a jib crane conveyor as in claim 11 and a storage magazine having a plurality of horizontal and vertical rows of magazine storage channels, a control switch for each channel disposed inwardly of its entrance, and control means associated with each switch and interconnected with the motor drive for the jib conveyor belt drives for stopping said conveyors when a product unit is at rest on a switch for a period longer than the normal transmit time of a product unit over said switch.

14. A combination as in claim 13 in which is provided a master tape having thereon in code product identification and sequence of position of the respective products in transit to said jib crane conveyor, and that the magazine selector plug board is provided with means for selecting the positions of the jib crane conveyor in accordance with the products recorded on the matser tape, and means controlled jointly by said magazine selector plug board and the code information on the master tape, to stop the jib crane conveyors when a product code appears on the master tape which has not been preselected on said plug board.

15. In a system for controlling the dispatch of a plurality of products of discrete identity from a product accumulating station, to which a plurality of conveyor lines deliver said products, to a magazine storage having a conveyor provided with controls for establishing the position of the conveyor by predetermined horizontal and vertical traverse motions, the combination of a master tape and a punching mechanism therefor, said punching mechanism having means operable in response to the identity and sequence at which products leave the accumulating station for punching in said master tape code perforations corresponding to and specifically identifying each of the products leaving the accumulating station, a reader for said master tape having mechanism responsive to the presence of a discrete product at the discharge end of the conveyor, said reader also having means actuated by the code information on said master tape for transmitting signals to identify the specific product appearing at the discharge end of the conveyor, means for communicating said signals to the horizontal and vertical traverse motion controls whereby the conveyor delivers said specifically identified discrete product to preselected magazines, and means for actuating said reader to advance said master tape to a ready position for identifying each subsequent discrete product appearing at the discharge end of said conveyor.

16. A system as in claim 15 in which the conveyor is provided with a belt section having horizontal traverse only and a belt section having horizontal traverse with the first-mentioned section and vertical traverse relative to the same, said belt sections having motor drives and controls therefor for starting and stopping the same, and said magazine storage having a plurality of vertically and horizontally arranged rows of magazine channels for receiving goods from the conveyor and provided with means for stopping the belt driving motors in response to any magazine channel being filled to capacity.

17. A system as in claim 16 in which a product dispatch plug board is provided having control selections arranged for connecting the master tape transmitted signals to the conveyor horizontal and vertical traverse controls to affect positioning of the conveyor in accordance with a pre-selected arrangement of choice, the transfer of one choice to another being controlled by a magazine channel full responsive device which operates to stop the conveyor belt and then to effect the transfer to the next choice position.

18. In an article conveyor system for transporting discrete quantities of articles differing in kind from a point of origin to a magazine station having a plurality of magazines arranged vertically and horizontally where the articles may be stored by kind, said system including a single line conveyor for transporting discrete articles of differing kinds from the point of origin to a predetermined location, and a second single line conveyor for transporting articles from said location to selected magazines and having a section which is movable vertically and horizontally, means for automatically releasing at the point of origin discrete articles of differing kind, to said origin conveyor, means for automatically recording in code an identifying record on a master tape of each article released as well as the sequence of release of each article, to said origin conveyor, means for transferring the code identifying record to a second code recording means for indicating thereon in code the sequential position of the products on said origin conveyor line, means for positioning the movable conveyor section, and means responsive to the code recorded by said second recording means for so controlling the second conveyor line positioning means that the articles are delivered by said conveyor section to magazines selected for particular kinds of articles and means for automatically selecting the magazines.

19. A system as in claim 18 in which the second conveyor line includes a fixed section which is arranged to feed articles to the movable section.

20. A system as in claim 18 in which a product dispatch plug board is provided having control selections arranged for connecting the master tape transmitted signals to the control means for the conveyor section having vertical and horizontal traverse, to effect positioning of said conveyor section in accordance with a pre-selected arrangement of choice, the transfer of one choice to another being controlled by a magazine channel-full responsive device which operates to stop the conveyor having horizontal and vertical traverse and then to effect transfer of said conveyor section to the next choice position.

21. In an article conveyor system for transporting discrete quantities of articles, differing in kind, from a point of origin to a storage station having a plurality of storage magazines where the articles are stored by kind, said system including a plurality of point of origin, single line, conveyors each of which is adapted to transport discrete articles, differing in kind, to a predetermined location, and a second single line conveyor for transporting articles from said predetermined location to selected storage magazines, means for automatically releasing to the respective point of origin conveyors discrete articles, differing in kind, means for automatically recording in code a record of each article released to each of said point of origin conveyors both as to kind of article released and its sequence of release to the respective lines, means for transferring the said respective recorded identifying codes to a second code recording means for indicating thereon in code the sequential position of the articles released by said point of origin conveyor lines, and means for discharging articles from said second conveyor to storage magazines selected for particular kinds of articles, said last mentioned means responsive to the code recorded by said second recording means.

22. In an unattended material handling system, a plurality of individual-product-conveyors for each of a plurality of discrete known products, means merging the products of said individual-product-conveyors onto a single-line accumulator-conveyor for conveying the respective discrete known products in random sequence, a single-line selector-conveyor receiving said products from said accumulator-conveyor in the aforesaid random sequence, a plurality of product dispatch areas, means operable for selectively positioning said selector-conveyor to deliver specific products to certain pre-selected dispatch areas, control means for creating a record of the sequence in which the respective discrete products leave each of said individual-product-conveyors, and control means for reading said record and routing the discrete known products from said selector-conveyor directly into specific dispatch areas, and means operable for establishing the order in which the specific dispatch areas receive said individual products in accordance with a predetermined order of selection.

23. In an unattended material handling system, a plurality of product-conveyors for a plurality of discrete known products, means merging the products of said product-conveyors onto a single-line accumulator-conveyor for conveying the respective discrete known products in random sequence, a single-line selector-conveyor receiving said products in random sequence from said accumulator conveyor, a plurality of product dispatch areas, means operable for selectively positioning said selector-conveyor to deliver specific products to certain pre-selected dispatch areas, control means for creating a record of the sequence in which the respective discrete products leave each of said product-conveyors, control means for creating from said aforesaid records a new record of the sequence in which the discrete known products are conveyed by said accumulator-conveyor, and control means for reading said new record and routing the discrete known products from said selector-conveyor directly into specific dispatch areas, and means operable for establishing the order in which the specific dispatch areas receive said individual products in accordance with a predetermined order of selection.

24. In an article conveyor system for transporting discrete quantities of articles, differing in kind from a point of origin to a storage station having a plurality of storage magazines where the articles are stored by kind, said system including two point-of-origin, single-line, conveyors each of which is adapted to transport discrete articles, differing in kind, to a predetermined location, and a second single line conveyor for transporting articles from said predetermined location to selected storage magazines, means for automatically releasing to one of the point-of-origin conveyors discrete articles, differing in kind, means for automatically recording in code a record of each article released to said point-of-origin conveyor both as to kind of article released and its sequence of release to the said line, means releasing to the other point-of-origin conveyor discrete articles, means for generating selective coded signals corresponding to the articles released to said last mentioned point-of-origin conveyor, means for transferring the respective recorded identification codes and the selective coded signals to a second code recording means for indicating thereon in code the sequential position of the articles released by said point-of-origin conveyor lines, and means for discharging articles from said second conveyor to a storage magazine selected for particular kinds of articles, said last mentioned means responsive to the code recorded by said second recording means.

References Cited in the file of this patent

UNITED STATES PATENTS

| | | |
|---|---|---|
| 938,285 | Suren | Oct. 26, 1909 |
| 1,110,643 | Peirce | Sept. 15, 1914 |
| 1,753,036 | Williamson et al. | Apr. 1, 1930 |
| 1,800,898 | Nelson | Apr. 14, 1931 |
| 2,081,900 | Brown et al. | June 1, 1937 |
| 2,386,520 | Watson et al. | Oct. 9, 1945 |
| 2,577,070 | Cheney | Dec. 4, 1951 |
| 2,577,083 | Lake et al. | Dec. 4, 1951 |
| 2,587,686 | Berry | Mar. 4, 1952 |
| 2,634,869 | Hicks | Apr. 14, 1953 |

(Other references on following page)

UNITED STATES PATENTS

| | | |
|---|---|---|
| 2,679,354 | Skillman | May 25, 1954 |
| 2,717,086 | Bush | Sept. 6, 1955 |
| 2,732,084 | Chaussee et al. | Jan. 24, 1956 |
| 2,753,975 | Day et al. | July 10, 1956 |
| 2,819,786 | Walters | Jan. 14, 1958 |
| 2,880,891 | Carroll | Apr. 7, 1959 |

FOREIGN PATENTS

| | | |
|---|---|---|
| 424,549 | Germany | Jan. 27, 1926 |
| 717,018 | Great Britain | Oct. 20, 1954 |
| 632,403 | Great Britain | Nov. 28, 1949 |